(12) United States Patent
Benko et al.

(10) Patent No.: US 9,218,116 B2
(45) Date of Patent: Dec. 22, 2015

(54) TOUCH INTERACTION WITH A CURVED DISPLAY

(76) Inventors: Hrvoje Benko, Seattle, WA (US); Andrew D. Wilson, Seattle, WA (US); Billy Chen, Bellevue, WA (US); Ravin Balakrishnan, Toronto (CA); Patrick M. Baudisch, Seattle, WA (US)

(*) Notice: Subject to any disclaimer, the term of this patent is extended or adjusted under 35 U.S.C. 154(b) by 775 days.

(21) Appl. No.: 12/344,377

(22) Filed: Dec. 26, 2008

(65) Prior Publication Data
US 2010/0020026 A1  Jan. 28, 2010

Related U.S. Application Data

(60) Provisional application No. 61/083,679, filed on Jul. 25, 2008.

(51) Int. Cl.
| | |
|---|---|
| *G06F 3/048* | (2013.01) |
| *G06F 3/0486* | (2013.01) |
| *G06F 3/041* | (2006.01) |
| *G06F 3/042* | (2006.01) |
| *G06F 3/0488* | (2013.01) |

(52) U.S. Cl.
CPC .............. *G06F 3/0486* (2013.01); *G06F 3/041* (2013.01); *G06F 3/042* (2013.01); *G06F 3/0488* (2013.01); *G06F 3/04883* (2013.01); *G06F 2203/04808* (2013.01)

(58) Field of Classification Search
CPC ............ G06F 3/04815; G06F 3/04845; G06F 3/0486; G06F 3/041; G06F 3/042; G06F 3/0488; G06F 3/04883; G06F 2203/04808
USPC ................... 715/834, 863, 764; 345/678, 679
See application file for complete search history.

(56) References Cited

U.S. PATENT DOCUMENTS

| | | |
|---|---|---|
| 4,311,468 A | 1/1982 | Kiel et al. |
| 4,645,459 A | 2/1987 | Graf et al. |
| 5,315,692 A | 5/1994 | Hansen et al. |

(Continued)

FOREIGN PATENT DOCUMENTS

| | | |
|---|---|---|
| EP | 1195637 | 4/2002 |
| FR | 2821168 | 8/2002 |

(Continued)

OTHER PUBLICATIONS

International Search Report and Written Opinion Received for PCT Application No. PCT/US2009/051659, mailed on Mar. 2, 2010, 12 pages.

(Continued)

*Primary Examiner* — Aaron Lowenberger
(74) *Attorney, Agent, or Firm* — Alin Corie; Sandy Swain; Micky Minhas

(57) ABSTRACT

Touch interaction with a curved display (e.g., a sphere, a hemisphere, a cylinder, etc.) is enabled through various user interface (UI) features. In an example embodiment, a curved display is monitored to detect a touch input. If a touch input is detected based on the act of monitoring, then one or more locations of the touch input are determined. Responsive to the determined one or more locations of the touch input, at least one user UI feature is implemented. Example UI features include an orb-like invocation gesture feature, a rotation-based dragging feature, a send-to-dark-side interaction feature, and an object representation and manipulation by proxy representation feature.

20 Claims, 13 Drawing Sheets

(56) References Cited

U.S. PATENT DOCUMENTS

| | | | |
|---|---|---|---|
| 5,414,521 A | 5/1995 | Ansley | |
| 5,463,725 A | 10/1995 | Henckel et al. | |
| 5,852,450 A * | 12/1998 | Thingvold | 345/473 |
| 5,945,985 A | 8/1999 | Babin et al. | |
| 5,990,990 A | 11/1999 | Crabtree | |
| 6,008,800 A | 12/1999 | Pryor | |
| 6,016,385 A | 1/2000 | Yee et al. | |
| 6,027,343 A | 2/2000 | Ho | |
| 6,064,423 A | 5/2000 | Geng | |
| 6,100,862 A | 8/2000 | Sullivan | |
| 6,115,025 A | 9/2000 | Buxton et al. | |
| 6,124,685 A | 9/2000 | Toriu et al. | |
| 6,278,419 B1 | 8/2001 | Malkin | |
| 6,409,351 B1 | 6/2002 | Ligon | |
| 6,411,337 B2 * | 6/2002 | Cove et al. | 348/563 |
| 6,449,887 B1 | 9/2002 | Song | |
| 6,527,555 B1 | 3/2003 | Storm | |
| 6,720,956 B1 | 4/2004 | Honma | |
| 6,753,847 B2 | 6/2004 | Kurtenbach et al. | |
| 6,756,966 B2 | 6/2004 | Dirksen et al. | |
| 6,773,262 B1 | 8/2004 | Blum | |
| 6,793,350 B1 | 9/2004 | Raskar | |
| 7,084,859 B1 | 8/2006 | Pryor | |
| 7,390,092 B2 | 6/2008 | Belliveau | |
| 7,466,843 B2 | 12/2008 | Pryor | |
| 7,535,489 B2 | 5/2009 | Nonaka et al. | |
| 7,710,391 B2 | 5/2010 | Bell et al. | |
| 8,066,378 B2 | 11/2011 | Lalley | |
| 2002/0070277 A1 | 6/2002 | Hannigan | |
| 2003/0006973 A1 * | 1/2003 | Omura et al. | 345/175 |
| 2003/0142144 A1 | 7/2003 | Balakrishnan et al. | |
| 2004/0001111 A1 | 1/2004 | Fitzmaurice et al. | |
| 2004/0184013 A1 | 9/2004 | Raskar et al. | |
| 2004/0260469 A1 | 12/2004 | Mizusawa | |
| 2005/0001920 A1 | 1/2005 | Endler | |
| 2005/0110964 A1 | 5/2005 | Bell et al. | |
| 2005/0275628 A1 * | 12/2005 | Balakrishnan et al. | 345/156 |
| 2006/0007170 A1 | 1/2006 | Wilson et al. | |
| 2006/0017692 A1 | 1/2006 | Wehrenberg et al. | |
| 2006/0125822 A1 | 6/2006 | Kurtenbach et al. | |
| 2006/0132501 A1 | 6/2006 | Nonaka et al. | |
| 2006/0167990 A1 | 7/2006 | Tobiasen | |
| 2006/0227303 A1 | 10/2006 | Matsubara et al. | |
| 2006/0227416 A1 | 10/2006 | Balu et al. | |
| 2007/0035513 A1 * | 2/2007 | Sherrard et al. | 345/157 |
| 2007/0152966 A1 | 7/2007 | Krah et al. | |
| 2007/0152984 A1 | 7/2007 | Ording et al. | |
| 2007/0159459 A1 | 7/2007 | Wang | |
| 2007/0183685 A1 | 8/2007 | Wada | |
| 2007/0229546 A1 | 10/2007 | Klassen et al. | |
| 2007/0247435 A1 | 10/2007 | Benko et al. | |
| 2007/0247439 A1 | 10/2007 | Daniel | |
| 2007/0257891 A1 | 11/2007 | Esenther et al. | |
| 2007/0271524 A1 * | 11/2007 | Chiu et al. | 715/767 |
| 2007/0279381 A1 | 12/2007 | Odell et al. | |
| 2008/0084400 A1 * | 4/2008 | Rosenberg | 345/173 |
| 2008/0088587 A1 | 4/2008 | Pryor | |
| 2008/0088593 A1 | 4/2008 | Smoot | |
| 2008/0109717 A1 | 5/2008 | Krauter | |
| 2008/0150913 A1 | 6/2008 | Bell et al. | |
| 2008/0152297 A1 * | 6/2008 | Ubillos | 386/52 |
| 2008/0158145 A1 * | 7/2008 | Westerman | 345/156 |
| 2008/0165136 A1 | 7/2008 | Christie et al. | |
| 2008/0179507 A2 | 7/2008 | Han | |
| 2008/0180399 A1 | 7/2008 | Cheng | |
| 2008/0189658 A1 * | 8/2008 | Jeong et al. | 715/810 |
| 2008/0211779 A1 | 9/2008 | Pryor | |
| 2009/0027381 A1 | 1/2009 | Lee | |
| 2009/0027622 A1 | 1/2009 | Lalley et al. | |
| 2009/0040236 A1 * | 2/2009 | Childress et al. | 345/629 |
| 2009/0051671 A1 * | 2/2009 | Konstas | 345/174 |
| 2009/0059096 A1 | 3/2009 | Yamamoto et al. | |
| 2009/0167723 A1 | 7/2009 | Kwong et al. | |
| 2009/0189857 A1 | 7/2009 | Benko | |
| 2009/0189917 A1 | 7/2009 | Benko | |
| 2010/0023895 A1 | 1/2010 | Benko | |
| 2010/0182236 A1 | 7/2010 | Pryor | |
| 2010/0220895 A1 | 9/2010 | Koren et al. | |
| 2010/0265178 A1 | 10/2010 | Benko | |
| 2011/0102319 A1 | 5/2011 | Lin et al. | |

FOREIGN PATENT DOCUMENTS

| | | |
|---|---|---|
| JP | 2001-021833 A | 1/2001 |
| JP | 2002-532795 A | 10/2002 |
| JP | 2003-009039 | 1/2003 |
| JP | 2003-035933 | 2/2003 |
| JP | 2005-099064 A | 4/2005 |
| JP | 2006-094458 | 4/2006 |
| JP | 2006-184573 A | 7/2006 |
| WO | 00/35200 A1 | 6/2000 |
| WO | WO2005/114624 | 12/2005 |
| WO | WO2005/119431 | 12/2005 |
| WO | 2007/136372 A1 | 11/2007 |

OTHER PUBLICATIONS

Kettner, S. et al.; "Direct Rotational Interaction with a Spherical Projection"; Proceedings of the Creativity & Cognition Symposium on Interaction: Systems, Practice and Theory; Nov. 16-19, 2004; Sydney, Australia.

Chan, L.W. et al.; "Gesture-Based Interaction for a Magic Crystal Ball"; 14th International Conference on ACM Virtual Reality Software and Technology; Nov. 5-7, 2007; Newport Beach, California.

Grossman, T. et al.; "Multi-Finger Gestural Interaction with 3D Volumetric Displays"; UIST '04; vol. 6, Issue 2; Jul. 2005.

Benko, H. et al.; "Sphere: Multi-Touch Interactions on a Spherical Display"; ACM Conference Proceedings UIST 2008; Oct. 22, 2008; pp. 77-86.

EP Patent Appln. 09801053.1; Extended European Search Report dated Nov. 8, 2011.

Ricker, T.; "Apple Applies for Multi-Touch Mouse Patent"; Retrieved at http://www.engadget.com/2007/07/05/apple-applies-for-multi-touch-mouse-patent/; Jul. 5, 2007; pp. 1-5.

Christensen, B.; "Sensisphere Multitouch Hemisphere Display"; Retrieved at http://www.technovelgy.com/ct/Science-Fiction-News.asp?NewsNum=1560; Nov. 10, 2008; pp. 1-3.

Hinckley, et al.; "Touch-Sensing Input Devices"; CHI'99 Proceedings Conf. on Human Factors in Computing Systems; May 1999; 8 pages.

Balakrishnan, et al.; "The PadMouse: Facilitating Selection and Spatial Positioning for the Non-Dominant Hand"; CHI'98 Proceedings of 1998 ACM Conference on Human Factors in Computing Systems; Apr. 1998; pp. 9-16.

Han, J.; "Low-Cost Multi-Touch Sensing Through ted OALInternal Reflection"; UIST'05; Oct. 23-27, 2005; Seattle, Washington; pp. 115-118.

CN Patent Application 200980130059.X; First Office Action dated Dec. 12, 2012; 9 pages.

"Actuality Systems"; http://www.siggraph.org/s2002/exhibition/detail/400.html; 2002.

Balakrishnan; et al., "User Interfaces for Volumetric Displays", Mar. 2001. IEEE. pp. 37-45.

Buckminster, F.; "The Geoscope"; Critical Path 1981; http://www.well.com/user/abs/geoscope.html.

Chen et al.; "Flexible Active-Matrix Electronic Ink Display", 2003. Nature 423. p. 136.

Companje, R. et al.; "Globe4D, Time-Traveling with an Interactive Four-Dimensional Globe", MM'06, Oct. 23-27, 2006, Santa Barbara, California, USA. 2 Pages.

Dietz et al.; "DiamondTouch: A Multi-User Touch Technology", 2001, ACM UIST. pp. 219-226.

Fitzmaurice et al.; "Sentient Data Access via a Diverse Society of Devices". 2003. ACM Queue. pp. 53-62.

Fuller, B.; "The Geoscope"; from Education Automation, http://www.vterran.org/Misc/geoscope.html; 1962.

"Global Imagination"; http://www.globalimagination.com; downloaded Jan. 15, 2008.

(56) References Cited

OTHER PUBLICATIONS

Grossman et al.; "The Design and Evaluation of Selection Techniques for 3D Volumetric Displays", 2006. ACM UIST. pp. 3-12.
Hinckley et al.; "New Applications for the Touchscreen in 2D and 3D Medical Imaging Workstations"; Proceedings of SPIE Medical Imaging '95; Feb. 1995.
"iBall+"; http://www.audiovisualizers.com/library/store/iball/ibail.htm; downloaded Jan. 16, 2008.
Kruger et al.; "How People Use Orientation on Tables: Comprehension, Coordination and Communication", 2003, ACM SIGGROUP Conference on Supporting Group Work. pp. 369-378.
Leary; "Video Projections on a Globe Make Planetary Data Click"; http://www.nytimes.com/2006/06/13/science/13sphe.html?_r=4&adxnnl=1&oref=slogin&adxnnlx=1195256110-XujoB4n89dZC5/zH5rkocQ&oref=slogin&oref=slogin; Jun. 13, 2006.
Marchese et al.; "A Projected Hemispherical Display with a Gestural Interface", 2006, ACM SIGGRAPH Research Posters.
Matsushita et al.; "HoloWall: Designing a Finger, Hand, Body, and Object Sensitive Wall", 1997, ACM UIST. pp. 209-210.
Morris et al.; "Beyond 'Social Protocols': Multi-User Coordination Policies for Co-located Groupware". 2004. ACM CSCW, pp. 262-265.
"The Omniglobe: A Self-Contained Spherical Display System" Emerging Technologies—SIGGRAPH 2003; http://www.siggraph.org/s2003/conference/etech/omniglobe.html; 2003.
"OmniGlobe Technology"; ARC Science Simulations; http://www.arcscience.com/systemDetails/omniTechnology.html; downloaded Jan. 16, 2008.
"PufferSphere" by Pufferfish; http://pufferfishdisplays.co.uk; downloaded May 13, 2008.
Rekimoto; "SmartSkin: An Infrastructure for Free-hand Manipulation on Interactive Surfaces", 2002. ACM CHI. pp. 113-120.
"Science on a Sphere"; http://sos.noaa.gov; downloaded Jan. 16, 2008.
Scott et al.; "Territoriality in Collaborative Tabletop Workspaces" , 2004. ACM CSCW, pp. 294-303.
Shen et al.; "DiamondSpin: An Extensible Toolkit for Around-the-Table Interaction", ACM, CHI. pp. 167-174.
Shibano et al.; "CyberDome: PC Clustered Hemi Spherical Immersive Projection Display", In Proc. of the 2003 International Conference on Artificial Reality and Telexistence (ICAT 2003), Tokyo, Japan, Dec. 3-5, 2003, pp. 1-7.
Shoemake; "Animating Rotation with Quaternion Curves", 1985. ACM SIGGRAPH. pp. 245-253.
Shoemake; "ARBCALL: A User Interface for Specifying Three-Dimensional Orientation Using a Mouse", 1992. Graphics Interface. pp. 151-156.
Ushida et al.; "i-ball2: An Interaction Platform with a Crystal-ball-like Display for Multiple Users", 2003. International Conference on Artificial Reality and Teleexistence.
"The Videoglobe"; http://www.videoinmotion.com/VideoGlobePage.htm; downloaded Jan. 16, 2008.
Wilson; "TouchLight: An Imaging Touch Screen and Display for Gesture-Based Interaction", 2004. ICMI Conference on Multimodal Interfaces. pp. 69-76.
Wilson; "PlayAnywhere: A Compact Tabletop Computer Vision System", 2005. ACM UIST. pp. 83-92.
Wu, et al.; "Multi-Finger and Whole Hand Gestural Interaction Techniques for Multi-User Tabletop Displays". 2003, ACM UIST. pp. 193-202.
Yang et al.; "PixelFlex: A Reconfigurable Multi-Projector Display System", Proceedings of the conference on Visualization '01, Oct. 21-26, 2001, San Diego, California, 9 Pages.
Yip, et al.; "Visualising Internet Traffic Data with Three-Dimensional Spherical Display", proceedings of the 2005 Asia-Pacific symposium on Information 4isualization—vol. 45, Sydney, Australia, Year of Publication: 2005, pp. 153-158.
PCT Patent Application PCT/US2008/088124; International Search Report and Written Opinion of Jun. 23, 2009; 11 pages.
PCT Patent Application PCT/US2009/051659; International Search Report and Written Opinion dated Mar. 2, 2010; 12 pages.
EP Patent Application 08871181.7; Extended European Search Report of Dec. 20, 2010; 11 pages.
CN Patent Application 200880125597.5; First Office Action dated Aug. 26, 2011; 8 pages.
CN Patent Application 200880125597.5; Second Office Action dated Feb. 13, 2012; 6 pages.
Liang, et al., "JDCAD: A Highly Interactive 3D Modeling System", in Computer and Graphics, vol. 18, No. 4, 1994, pp. 499-506.
"Second Office Action for Chinese Patent Application No. 200980130059.x", Mailed Date: Aug. 6, 2013, 6 pages.
"Notice of Allowance for Chinese Patent Application No. 200980130059.x", Mailed Date: Feb. 13, 2014, 9 pages.
"Office Action for European Patent Application No. 09801053.1", Mailed Date: Nov. 25, 2011, 1 page.
"Notice of Rejection for Japanese Patent Application No. 2010-544301", Mailed Date: Jan. 18, 2013, 4 pages.
"Extended European Search Report for European Patent Application No. 08871181.7", Mailed Date: Dec. 20, 2010, 11 pages.
"Office Action for European Patent Application No. 08871181.7", Mailed Date: Jan. 7, 2011, 1 page.
"Office Action for European Patent Application No. 08871181.7", Mailed Date: Sep. 21, 2011, 5 pages.
"Office Action Patent Application No. 08871181.7", Mailed Date: May 17, 2013, 5 pages.
"Final Office Action for Japanese Patent Application No. 2010-544301", Mailed Date: May 24, 2013, 5 pages.
"Decision of Refusal for Japanese Patent Application No. 2010-544301", Mailed Date: Oct. 15, 2013, 6 pages.
"Response to First Office Action for Chinese Patent Application No. 200980130059.x", Mailed Date: Dec. 12, 2012, Filed Date: Apr. 8, 2013, 13 pages.
"Response to Office Action for European Patent Application No. 09801053.1", Mailed Date: Nov. 25, 2011, Filed Date: Jun. 4, 2012, 20 pages.
"Response to Office Action for European Patent Application No. 08871181.7", Mailed Date: Jan. 7, 2011, Filed Date: Jul. 14, 2011, 18 pages.
"Response to Office Action for European Patent Application No. 08871181.7", Mailed Date: Sep. 21, 2011, Filed Date: Nov. 4, 2011, 4 pages.
"Response to Official Communication for European Patent Application No. 08871181.7", Mailed Date: May 17, 2013, Filed Date: Sep. 6, 2013, 16 pages.
"Notice of Appeal and Amendment for Japanese Patent Application No. 2010-544301", Filed Date: Feb. 13, 2014, 15 pages.
Bowman, et al., "3D User Interfaces: Theory and Practice", Addison-Wesley, Boston, 2004, Chapter 3, pp. 40-59.
"Response to Second Office Action for Chinese Patent Application No. 200980130059.x", Filed Date: Oct. 16, 2013, 17 pages.
"Notice of Allowance for Japanese Patent Application 2011-520221" Filed Date: Oct. 6, 2013.
"Summons to Attend Oral Proceedings Pursuant to Rule 115(1) EPC for European Patent Application 08871181.7" Mailed Aug. 18, 2014.
"Non-Final Office Action," From U.S. Appl. No. 12/122,736, filed May 19, 2008, Mailed: Jul. 11, 2011.
"Response to the Jul. 11, 2011 Non-Final Office Action," From U.S. Appl. No. 12/122,736, filed Dec. 7, 2011.
"Non-Final Office Action," From U.S. Appl. No. 12/122,736, Mailed: Feb. 2, 2012.
"Response to the Feb. 2, 2012 Non-Final Office Action," From U.S. Appl. No. 12/122,736, filed Jun. 1, 2012.
"Non-Final Office Action," From U.S. Appl. No. 12/122,736, Mailed: Oct. 3, 2012.
"Response to the Oct. 3, 2012 Non-Final Office Action," From U.S. Appl. No. 12/122,736, filed Mar. 31, 2013.
"Final Office Action," From U.S. Appl. No. 12/122,736, Mailed: Apr. 18, 2013.
"Response to the Apr. 18, 2013 Final Office Action," From U.S. Appl. No. 12/122,736, filed Sep. 18, 2013.
"Non-Final Office Action," From U.S. Appl. No. 12/122,736, Mailed: Nov. 29, 2013.

(56) References Cited

OTHER PUBLICATIONS

"Response to the Nov. 29, 2013 Non-Final Office Action," From U.S. Appl. No. 12/122,736, filed Apr. 29, 2014.
"Final Office Action," From U.S. Appl. No. 12/122,736, Mailed: Aug. 1, 2014.
"Response to the Aug. 1, 2014 Final Office Action," From U.S. Appl. No. 12/122,736, filed Jan. 30, 2015.
"Non-Final Office Action," From U.S. Appl. No. 12/122,745, filed May 19, 2008, Mailed: Jun. 11, 2011.
"Response to the Jun. 11, 2011 Non-Final Office Action," From U.S. Appl. No. 12/122,745, filed Nov. 7, 2011.
"Non-Final Office Action," From U.S. Appl. No. 12/122,745, Mailed: Jan. 31, 2012.
"Response to the Jan. 31, 2012 Non-Final Office Action," From U.S. Appl. No. 12/122,745, filed May 31, 2012.
"Non-Final Office Action," From U.S. Appl. No. 12/122,745, Mailed: Aug. 15, 2012.
"Response to the Aug. 15, 2012 Non-Final Office Action," From U.S. Appl. No. 12/122,745, filed Feb. 5, 2013.
"Final Office Action," From U.S. Appl. No. 12/122,745, Mailed: Apr. 19, 2013.
"Response to the Apr. 19, 2013 Final Office Action," From U.S. Appl. No. 12/122,745, filed Sep. 19, 2013.
"Non-Final Office Action," From U.S. Appl. No. 12/122,745, Mailed: Nov. 26, 2013.
"Response to the Nov. 26, 2013 Non-Final Office Action," From U.S. Appl. No. 12/122,745, filed Apr. 28, 2014.
"Notice of Allowance," From U.S. Appl. No. 12/122,745, Mailed: Jul. 7, 2014.
"Non-Final Office Action," From U.S. Appl. No. 12/344,411, filed Dec. 26, 2008, Mailed: Jun. 9, 2011.
"Response to the Jun. 9, 2011 Non-Final Office Action," From U.S. Appl. No. 12/344,411, filed Sep. 14, 2011.
"Final Office Action," From U.S. Appl. No. 12/344,411, Mailed: Nov. 30, 2011.
"Response to the Nov. 30, 2011 Final Office Action," From U.S. Appl. No. 12/344,411, filed Feb. 16, 2012.
"Non-Final Office Action," From U.S. Appl. No. 12/344,411, Mailed: Sep. 30, 2013.
"Response to the Sep. 30, 2013 Non-Final Office Action," From U.S. Appl. No. 12/344,411, filed Dec. 27, 2013.
"Notice of Allowance," From U.S. Appl. No. 12/344,411, Mailed: Apr. 8, 2014.
"Voluntary Amendment," From U.S. Appl. No. 12/344,411, filed Jul. 16, 2014.
"Notice of Allowance," From U.S. Appl. No. 12/344,411, Mailed: Dec. 5, 2014.
Examiner Interview Summary mailed Sep. 15, 2015 from U.S. Appl. No. 12/344,411, 3 pages.
Notice of Allowance mailed Jan. 14, 2015 from U.S. Appl. No. 12/344,411, 11 pages.
Notice of Allowance mailed May 6, 2015 from U.S. Appl. No. 12/344,411, 12 pages.
Response to Second Office Action filed Oct. 16, 2013 from Chinese Patent Application No. 200980130059.X, 17 pages.
Communication Pursuant to Rules 70(2) and 70a(2) mailed Nov. 25, 2011 from European Patent Application No. 09801053.2, 1 page.
Response filed Jun. 5, 2012 to the Communication Pursuant to Rules 70(2) and 70a(2) mailed Nov. 25, 2011 from European Patent Application No. 09801053.2, 20 pages.
Non-Final Office Action mailed Oct. 14, 2011 for U.S. Appl. No. 12/425,408, 16 pages.
Response to Non-Final Office Action filed Dec. 29, 2011 for U.S. Appl. No. 12/425,408, 11 pages.
Applicant Initiated Interview Summary mailed Dec. 29, 2011 for U.S. Appl. No. 12/425,408, 3 pages.
Final Office Action mailed Mar. 15, 2012 for U.S. Appl. No. 12/425,408, 17 pages.
Notice of Allowance mailed Oct. 3, 2012 for U.S. Appl. No. 12/425,408, 5 pages.
Notice of Allowance mailed Nov. 16, 2012 for U.S. Appl. No. 12/425,408, 5 pages.
Response filed Jul. 2, 2012 to the Final Office Action mailed Mar. 15, 2012 from U.S. Appl. No. 12/425,408, 14 pages.
Non-Final Office Action mailed May 20, 2015 for U.S. Appl. No. 12/122,736, 18 pages.
Response to First Office Action filed Dec. 22, 2011 for Chinese Patent Application No. 200880125587.5, 23 pages.
Response to Second Office Action filed Apr. 10, 2012 for Chinese Patent Application No. 2008801255875, 21 pages.
Notice of Allowance mailed Jun. 5, 2012 from Chinese Patent Application No. 200880125597.5, 4 pages.
Summons To Attend Oral Proceedings mailed Aug. 25, 2014 from European Patent Application No. 08871181.7, 4 pages.
Minutes mailed Feb. 6, 2015 from European Patent Application No. 08871181.7, 24 pages.
Notice of Allowance mailed Feb. 11, 2015 from European Patent Application No. 08871181.7, 51 pages.
Non-Final Office Action mailed Feb. 28, 2013 from Japanese Patent Application No. 2010-544301, 5 pages.
Notice of Allowance mailed Jan. 6, 2015 from Japanese Patent Application No. 2010-544031, 6 pages.
Response to Non-Final Office Action filed May 7, 2013 from Japanese Patent Application No. 2010-544301, 12 pages.
Final Office Action mailed Jul. 4, 2013 from Japanese Patent Application No. 2010-544301, 5 pages.
Response to Final Office Action filed Feb. 28, 2014 from Japanese Patent Application No. 2010-544301, 15 pages.
International Preliminary Report on Patentability mailed Jul. 27, 2010 from PCT Patent Application No. PCT/US2008/088124, 5 pages.
International Preliminary Report on Patentability mailed Jan. 25, 2011 from PCT Patent Application No. PCT/US2009/051659, 6 pages.
Response to Summons to Attend Oral Proceedings filed Dec. 12, 2014 from European Patent Application No. 08871181.7, 72 pages.
Response filed Nov. 3, 2011 to Office Action mailed Sep. 21, 2011 from European Patent Application No. 08871181.7, 5 pages.

* cited by examiner

| Orb-Like Invocation Gesture Unit [FIGS. 6A & 6B] 502 | Rotation-Based Dragging Unit [FIGS. 7A & 7B] 504 |
|---|---|
| Send-to-Dark-Side Interaction Unit [FIGS. 8A & 8B] 506 | Object Rep. & Manip. by Proxy Representation Unit [FIGS. 9A & 9B] 508 |

TOUCH INTERACTION WITH A CURVED DISPLAY

CROSS-REFERENCE TO RELATED APPLICATION

This Nonprovisional U.S. patent application claims the benefit of U.S. Provisional Patent Application No. 61/083,679, which was filed 25 Jul. 2008 and entitled "Touch Interaction with a Curved Display". U.S. Provisional Patent Application No. 61/083,679 is hereby incorporated by reference in its entirety herein.

BACKGROUND

Visual output from computers and other electronic devices has historically been presented on flat screens. Even as cathode ray tube (CRT) monitors gave way to liquid crystal displays (LCDs) over the last few years, the screens have remained flat. User interaction with such flat screens was originally enabled at least primarily by way of the keyboard, which derived from the pre-existing typewriter. In the 1970s and 1980s, graphical user interface (GUI) technologies enabled mice and other pointer-type devices to be used for input.

When a pointer-type device is utilized for input, a user manipulates the device to move a pointer around a display screen. Typically, functionality is activated with the device by clicking on a given screen position, such as on an icon or a button. With the increased popularity of user interfaces that involve pointing and clicking, touch screen interfaces were developed. With a touch screen, a user may activate functionality by physically touching and/or pressing on a given screen position. However, such touch screens were still flat.

Recently, however, some curved displays have been created. For example, spherical displays of one kind or another have been developed. These spherical displays are especially employed in promotional environments or for the display of three-dimensional (3D) data. Spherical displays can offer an unobstructed 360° field-of-view to multiple users. This enables viewers to explore different perspectives of the displayed data by physically moving around the display.

Viewers can use the spherical nature of the display, their physical body position and orientation, and additional cues from the surrounding environment to aid them in spatially finding and understanding the data that is being displayed on a spherical surface. The characteristics of a display in a spherical form factor can afford interesting usage scenarios that go beyond what is possible with the more prevalent flat displays. Spherical displays also offer diverse interaction challenges. Unfortunately, conventional user interface (UI) technologies are rooted in traditional flat displays. As a result, conventional UI technologies fail to take advantage of the interesting usage scenarios and fail to address the diverse interaction challenges of curved displays.

SUMMARY

Touch interaction with a curved display (e.g., a sphere, a hemisphere, a cylinder, etc.) is enabled through various user interface (UI) features. In an example embodiment, a curved display is monitored to detect a touch input. If a touch input is detected based on the act of monitoring, then one or more locations of the touch input are determined. Responsive to the determined one or more locations of the touch input, at least one user UI feature is implemented. Example UI features include an orb-like invocation gesture feature, a rotation-based dragging feature, a send-to-dark-side interaction feature, and an object representation and manipulation by proxy representation feature.

For an example implementation of an orb-like invocation gesture feature, a presentation of a menu or a switching of tasks is invoked by making two relatively larger touch contacts in a substantially symmetrical position around a fixed point, such as the top of a spherical curved display. For an example implementation of a rotation-based dragging feature, objects that are dragged across a curved display are moved using a rotation that represents an arc defined by the dragging motion.

For an example implementation of a send-to-dark-side interaction feature, a relatively larger contact on an object for a predefined temporal threshold precipitates a warping of the object from one side of a curved display to another. For an example implementation of an object representation and manipulation by proxy representation feature, a proxy representation is displayed for a corresponding object on the other side of a curved display. Manipulations to the proxy representation are reflected in the corresponding object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other systems, methods, devices, media, apparatuses, arrangements, and other example embodiments are described herein.

BRIEF DESCRIPTION OF THE DRAWINGS

The same numbers are used throughout the drawings to reference like and/or corresponding aspects, features, and components.

FIG. 5 is a block diagram of an interaction unit having four example units: an orb-like invocation gesture unit, a rotation-based dragging unit, a send-to-dark-side interaction unit, and an object representation and manipulation by proxy representation unit.

DETAILED DESCRIPTION

As explained herein above, conventional UI technologies are rooted in traditional flat displays. Consequently, they fail to take advantage of the interesting usage scenarios of curved displays, and they also fail to address the diverse interaction challenges of curved displays. In contrast, certain embodiments that are described herein provide a set of touch interaction mechanisms and techniques that facilitate interaction and collaboration around a curved display. Approaches for direct touch interaction include those that address dragging, scaling, rotating, and other object manipulations on a curved display. Additional approaches provide for gestural interactions and implement touch UI concepts that accommodate the curved nature of the visual interface. Example embodiments and implementations are described further herein below.

Figure 1:
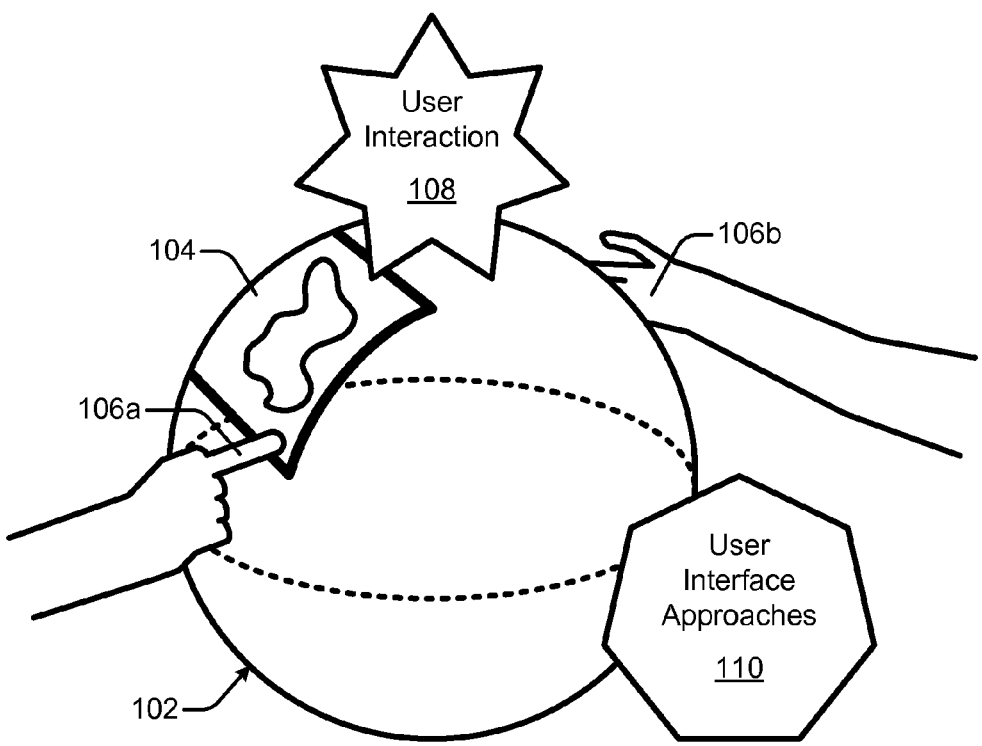
FIG. 1 illustrates an example user interaction environment for a curved display.

FIG. 1 illustrates an example UI environment 100 for a curved display 102. As illustrated, UI environment 100 includes curved display 102, an object 104, and multiple members 106. More specifically, object 104 is presented on curved display 102. Two members 106a and 106b are shown interacting with curved display 102. The elliptical shape formed from the dotted line indicates that curved display 102 is three-dimensional.

Generally, enabling user interaction on a curved surface involves the implementation of basic operations such as selection, dragging, rotation, scaling, and so forth. It may further entail providing support for browsing, task switching, and so forth. Each object (e.g., photo, video, etc.) can be independently dragged, rotated, and scaled. As with most touch-sensitive applications, selection of an object is implicitly triggered by a touch contact that lands on that object. Touch contacts that land on a video object act as a simple playback toggle—it starts the video playback if the video is paused or stops it if the video is running.

For example embodiments, the displayed elements of curved display 102 may be manipulated by members 106. Members 106 may be a finger or fingers, a hand or hands, a palm or palms, combinations thereof, and so forth. Members 106 may belong to the same or to different users. Although object 104 is shown as a photo or video, objects 104 may be any displayable element (e.g., web pages, textual documents, spreadsheets, raw data or images, combinations thereof, etc.).

Also, although curved display 102 is shown as a sphere, it may alternatively be cylindrical, cuboidal, hemispherical, a combination thereof, and so forth. Although the curved displays 102 that are illustrated in the drawings are spheres and are frequently described herein as being spherical, this is by way of example only. It should be understood that the principles and interactions explained herein are applicable to curved displays 102 generally.

User interactions 108 may include, for example, many different types of touches. The touches may vary by size, duration, location, movement, combinations thereof, and so forth. User interactions 108 may also include gestures, postures, combinations thereof, and so forth. These user interactions 108 may be defined and/or combined to enable different UI approaches 110, such as UI techniques and mechanisms. Different UI approaches 110 are described herein to take advantage of the properties of curved displays and/or to accommodate unusual characteristics of curved displays. Such properties and characteristics are described below.

Non-flat interactive displays have several properties that differ from their flat counterparts. Different interaction concepts may therefore be applied to curved displays. In particular, curved displays have the following three example inherent difficulties. First, the display surface is not a traditional Euclidian space, and it does not easily map into a flat space. This makes traditional flat interactions, such as a 2D translation, difficult. This first difficulty is described in greater detail herein below with particular reference to FIG. 2. Second, the movement of visual elements around the surface can result in potentially awkward orientations for the displaced elements, including with regard to the viewpoints of multiple collaborators who may surround the curved display. Third, a user may be limited to seeing at most one hemisphere because data or other objects that are located on the other side (e.g., the opposite hemisphere) are currently invisible to the user due to the curvature of the display.

Curved displays intrinsically possess a number of other differentiating characteristics. For example, they do not have a natural "master user" position. Each user may instead be afforded an egalitarian user experience. Also, the content that is visible to each user changes with their height and position. Moreover, as a user changes their height and position, a spherical display can seem to smoothly transition between a vertical and a horizontal surface.

As a user moves around a curved display, it appears to be borderless, yet it is actually finite. It also becomes apparent that there are no natural orientation landmarks. In practice, however, the top (or "north pole" for a spherical display) may be perceived to be the strongest natural landmark for a curved display. Additionally, because a user is typically limited to seeing at most one-half of a curved display, other areas of the curved display offer pseudo-privacy. In other words, what one user is viewing in one hemisphere is relatively obstructed from the vision of other users that are viewing the opposite hemisphere.

A set of multi-touch interaction mechanisms (or features) and techniques for curved displays that facilitate interaction and collaboration around curved displays are introduced below following the description of FIG. 2. Four example embodiments are described herein below with particular reference to the units of FIG. 5. These four example embodiments are described in greater detail with particular reference to FIGS. 6A/6B, 7A/7B, 8A/8B, and 9A/9B, respectively.

Figure 2:
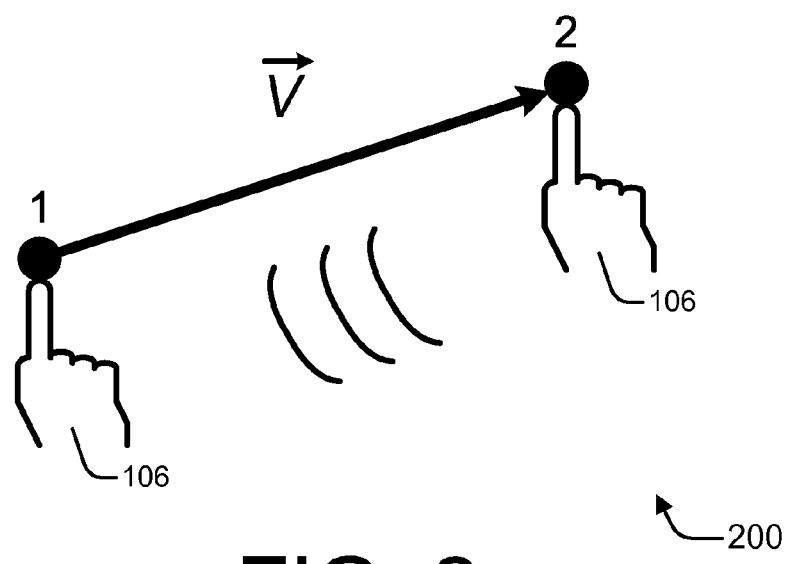
FIG. 2 depicts a straightforward approach to implementing a dragging operation with a display that may be manipulated by touch.

FIG. 2 depicts a straightforward approach 200 to implementing a dragging operation with a display that may be manipulated by touch. As illustrated, approach 200 includes a member 106, two points 1 and 2, and a vector $\vec{V}$. Member 106 moves from point 1 to point 2 while touching a display. This movement defines a vector $\vec{V}$. The vector $\vec{V}$ has a combined dimensionality along two or three orthogonal components. It may also be thought of as having both a direction and a magnitude component. A vector $\vec{V}$ may be used to translate an object in Euclidean space, such as over a flat display.

Enabling a user to drag an object around a spherical display, on the other hand, is not as straightforward as it may seem at first. A difficulty is that the curved geometry of the spherical surface is drastically different from 2D flat space. In Euclidean space (standard 2D and 3D environments fall into this category), movement may be represented by a displacement vector $\vec{V}$ that encapsulates the direction and magnitude of the movement in a particular line. However, a spherical surface is not a Euclidian space. There are no straight lines on a sphere as so-called "lines" are actually curves, which are more accurately represented as arcs. While in some cases Euclidean geometry might offer a reasonable local approximation, representing displacement on a sphere with vectors ultimately leads to problematic behaviors.

Thus, curved displays entail a number of properties that create UI difficulties. These properties include having a non-Euclidian space and having areas that may be obstructed from the view of a given user. Furthermore, curved displays may have areas that are unreachable by a user without the user moving around the display to a different position.

To at least ameliorate or otherwise address one or more of these described difficulties, characteristics, and/or properties of curved displays, certain example embodiments entail the implementation of UI approaches that are tailored to curved displays. For example, interaction techniques and user interface mechanisms can facilitate the multi-touch manipulation of displayed objects on curved surfaces. These approaches can enable easier collaboration between multiple users by exploiting the different characteristics of curved surfaces.

An example UI approach involves an orb-like invocation gesture. In an example implementation, a mode switch or a menu is invoked via a specific bimanual hand posture on the top of the curved display. The posture is relatively easy to remember, but relatively hard to invoke inadvertently. Another example UI approach involves facilitating the dragging of objects along a curved surface. In an example implementation, a rotation-oriented movement is used as the basic unit of dragging, instead of a translation-oriented displacement vector.

Yet another example UI approach involves a send-to-darkside interaction. In an example implementation, a user can "instantaneously" warp/move an object to the opposite side of a curved display. Yet another example UI approach involves a shadow object representation and manipulation. In an example implementation, a user is empowered to effectively "see" and manipulate objects on the other side of a curved display (e.g., objects that are otherwise at least partially invisible) using their proxy representation on a hemisphere that is closer to the user. The proxy representation may be a shadow or outline representation, for instance, of the actual object.

Figure 3:
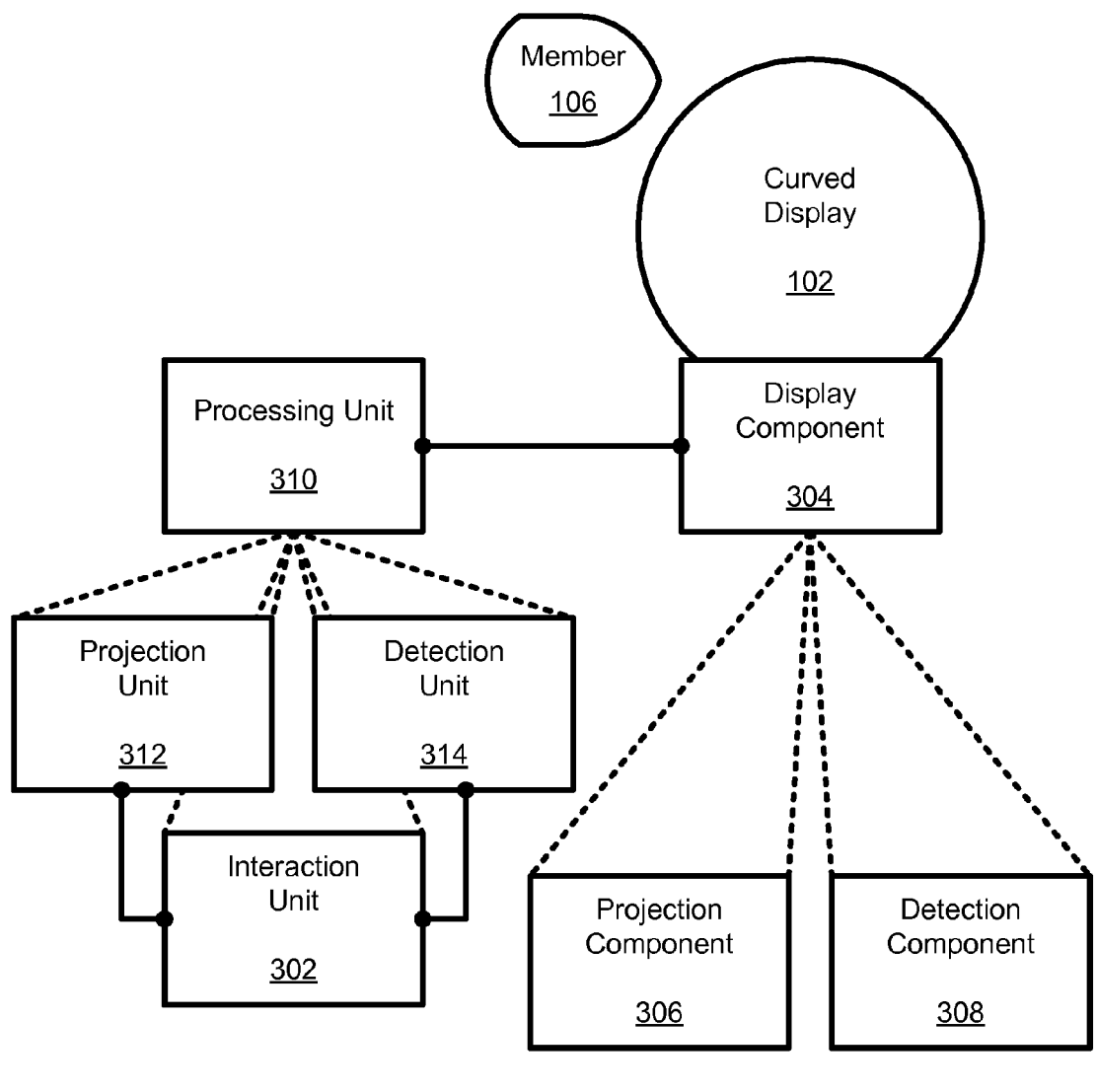
FIG. 3 is a block diagram of an example device having a curved display and the capability to enable interaction responsive to touch input via an interaction unit.

FIG. 3 is a block diagram of an example device 300 having a curved display 102 and the capability to enable interaction responsive to touch input via an interaction unit 302. As illustrated, device 300 includes curved display 102, a display component 304, and a processing unit 310. Display component 304 includes a projection component 306 and a detection component 308. Processing unit 310 includes a projection unit 312, a detection unit 314, and interaction unit 302. A member 106 is shown in proximity to curved display 102.

In example embodiments, curved display 102 may be any type of curved display having an interior and an exterior. Curved display 102 may have a diffuse surface for displaying images projected thereon by projection component 306. Examples for curved display 102 include, but are not limited to, spheres, cylinders, hemispheres, cuboids, combinations thereof, and so forth. In example implementations, curved display 102 at least partially encloses a space. It may also completely enclose a space, such as with a complete sphere or cuboid or a "solid" cylinder. Alternatively, it may partially enclose a space, such as with an open hemisphere or a cylinder with an open flat end. Other alternatives may also be implemented.

In an example embodiment, display component 304 is at least primarily a hardware component of device 300. Projection component 306 enables a projection of images onto curved display 102 (e.g., from the interior of the curved display). It may be realized, for instance, as a projector of light in the visible spectrum and a wide-angle lens. Detection component 308 enables one or more touch contacts by at least one member 106 on curved display 102 to be detected. Member(s) 106 may be, by way of example but not limitation, a finger, multiple fingers, a hand, multiple hands, one or more palms, some combination thereof, and so forth. Members 106 may originate from the same person or from different people.

Detection component 308 is adapted to detect when and where member 106 touches/contacts curved display 102. Detection component 308 may be realized, for instance, as a set of infrared (IR)-tuned light emitting diodes (LEDs) that emanate into and/or towards curved display 102 along with an IR detector that detects when the IR light is reflected back from curved display 102. The IR light may be reflected back from curved display 102 to detection component 308 by, for example, a touch of member 106. Detection component 308 is adapted to detect the location or locations of the touch or touches by member 106 on curved display 102. Moreover, detection component 308 may be capable of detecting a size of the touch (e.g., a finger versus a palm) by member 106. These detections may be provided to detection unit 314 of processing unit 310 for analysis to facilitate interaction with device 300 via touches on curved display 102.

Processing unit 310 may be realized, for example, with one or more processors and at least one memory. In an example operation, detection unit 314 provides locations and/or sizes of detected touch contacts to interaction unit 302. Interaction unit 302 is to enable UI interactions with device 300 via curved display 102. In an example embodiment, detection unit 314 detects whether a finger-sized or a palm-sized touch input is occurring at curved display 102 by detecting a size of the touch input and comparing the size of the detected touch input to a predetermined size threshold. Interaction unit 302 can then implement a UI feature based on whether the detected touch input is finger-sized or palm-sized.

Interaction unit 302 sends display commands for manipulating UI elements and other display items to projection unit 312. Projection unit 312 may control what images are projected onto curved display 102 by projection component 306. By way of example, interaction unit 302 may implement one or more of the embodiments described further herein. These embodiments are described (i) generally by way of an example flow diagram with reference to FIG. 4 and (ii) more specifically with reference to FIG. 5. Example embodiments are described in greater detail with reference to FIGS. 6A-9B.

Figure 4:
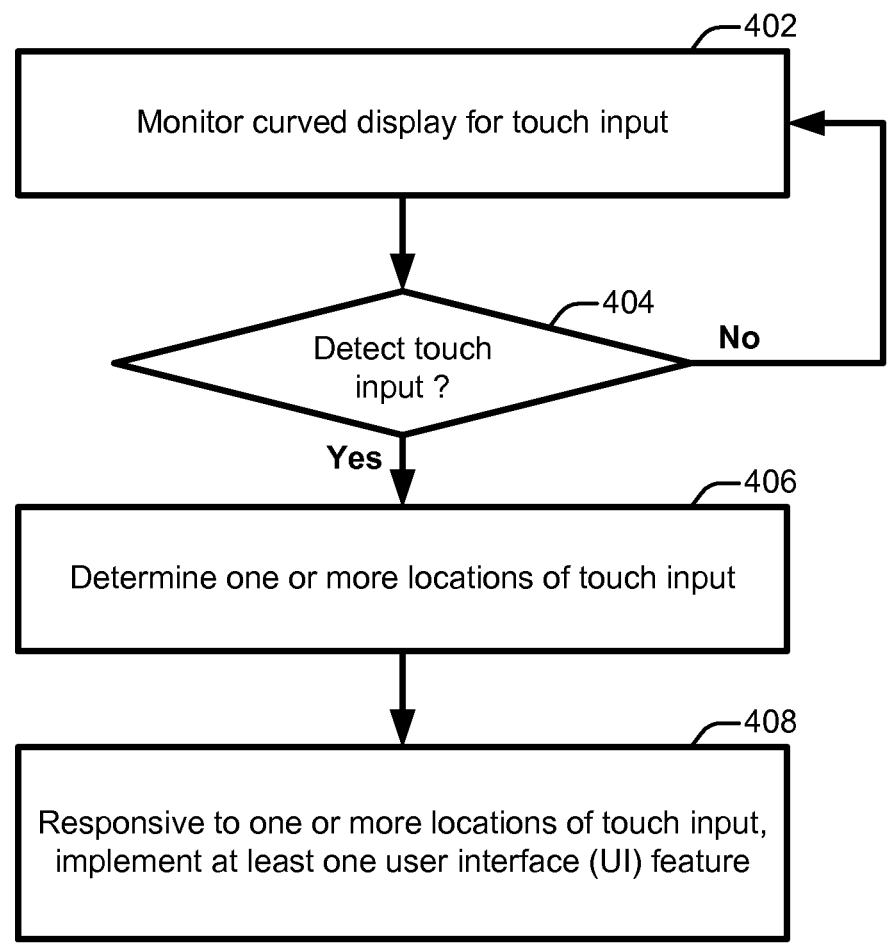
FIG. 4 is a flow diagram that illustrates an example of a method for touch interaction with a curved display.

FIG. 4 is a flow diagram 400 that illustrates an example of a method for touch interaction with a curved display. Flow diagram 400 includes four blocks 402-408. Implementations of flow diagram 400 may be realized, for example, as processor-executable instructions and/or as part of processing unit 310 (of FIG. 3), including at least partially by a projection unit 312, a detection unit 314, and/or an interaction unit 302. Example embodiments for implementing flow diagram 400 are described below with reference to the elements of FIGS. 1 and 3.

Figure 10:
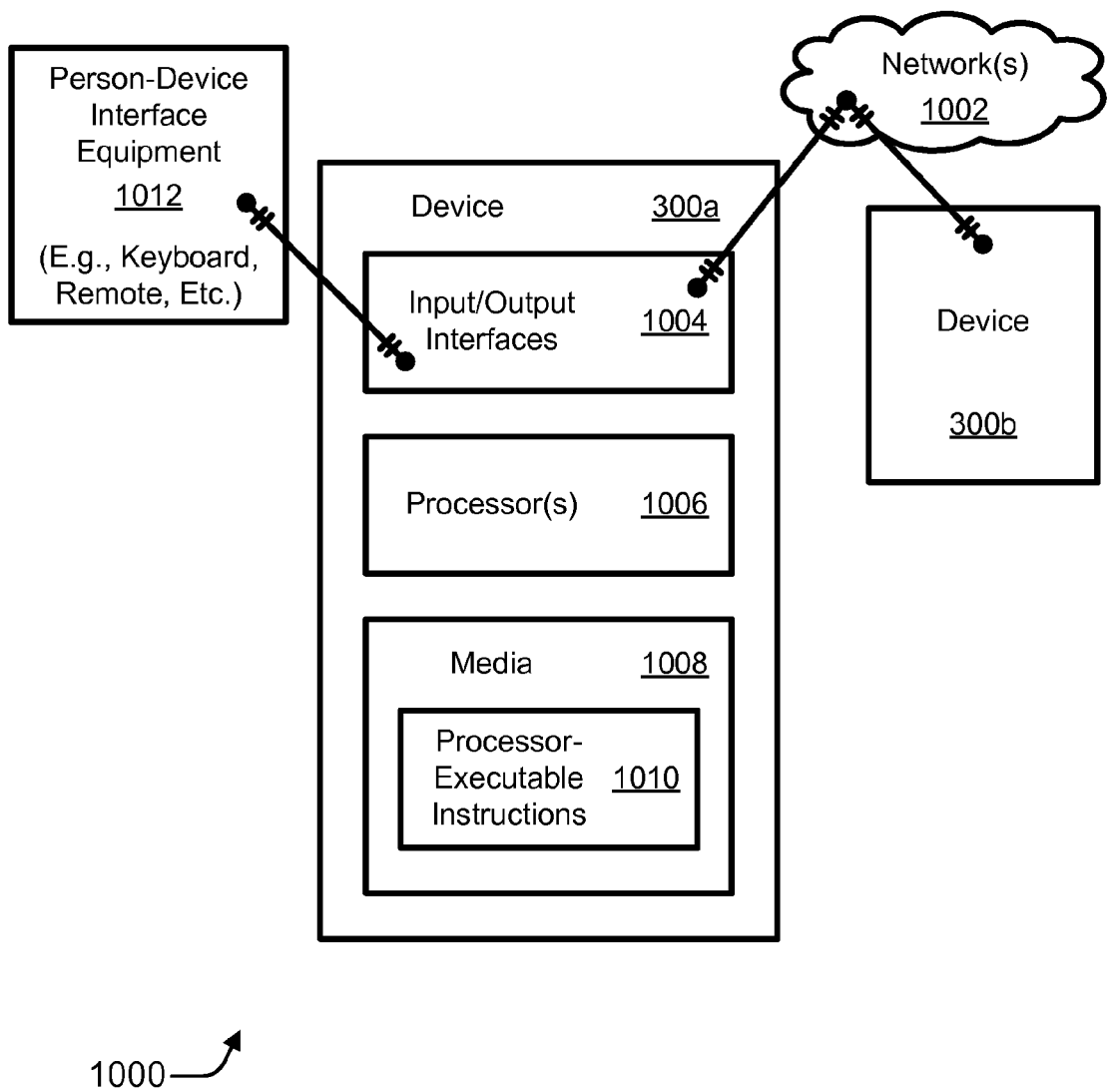
FIG. 10 is a block diagram illustrating example devices that may be used to implement embodiments for touch interaction with a curved display.

The acts of flow diagram 400 (and those of the other flow diagrams) that are described herein may be performed in many different environments and with a variety of different devices, such as by one or more processing devices (e.g., of FIG. 10). The order in which the methods are described is not intended to be construed as a limitation, and any number of the described blocks can be combined, augmented, rearranged, and/or omitted to implement a respective method, or an alternative method that is equivalent thereto. Although specific elements of certain other FIGS. are referenced in the description of the flow diagrams, the methods thereof may be performed with alternative elements.

For example embodiments, at block 402, a curved display is monitored for touch input. For example, a curved display 102 may be monitored by detection component 308 and/or detection unit 314 for touch input. At block 404, it is determined if touch input is detected. For example, detection unit 314 may monitor curved display 102 to detect touch input by one or more members 106. If no touch is detected, then the monitoring continues (at block 402).

If, on the other hand, touch input is detected (at block 404), then at block 406 one or more locations of the touch input are determined. For example, the location(s) of touch input(s) by member(s) 106 on curved display 102 may be determined. These determinations may entail ascertaining a size of the touch input (e.g., finger versus palm), ascertaining a number of touch inputs (e.g., number of fingers, palms, people, etc.) on the curved display, tracking movement(s) of the touch input, monitoring a duration of a touch input, some combination thereof, and so forth.

At block 408, at least one UI feature is implemented responsive to the one or more locations of touch input. For example, at least one UI approach (e.g., mechanism and/or technique) may be implemented by interaction unit 302 responsive to the determined location(s) of the touch input.

Example UI approaches are described generally herein below with particular reference to FIG. 5. Additional example embodiments are described more specifically with reference to FIGS. 6A-9B. Example UI approaches include those that involve moving displayed objects, those that involve detecting a palm-sized touch (e.g., as differentiated from a finger-sized touch) and responding accordingly, combinations thereof, and so forth.

FIG. 5 is a block diagram of example units 502-508 of an interaction unit 302 (of FIG. 3). As illustrated, interaction unit 302 includes an orb-like invocation gesture unit 502, a rotation-based dragging unit 504, a send-to-dark-side interaction unit 506, and an object representation and manipulation by proxy representation unit 508. Each of these units is capable of implementing at least one UI feature.

These units 502-508 of interaction unit 302 may be organized into categories. For example, rotation-based dragging unit 504 and object representation and manipulation by proxy representation unit 508 may be categorized as involving the movement of displayed objects around a curved display. Also, orb-like invocation gesture unit 502 and send-to-dark-side interaction unit 506 may be categorized as involving the detection of palm-sized touches with appropriate UI responses.

It should be noted that alternative categorizations may be applied to the various described embodiments. Furthermore, it should be understood that different embodiments may be placed in a different category or categories. For example, send-to-dark-side interaction unit 506 may also be categorized as involving the movement of displayed objects around a curved display.

In an example embodiment with regard to orb-like invocation gesture unit 502, two palms touching the curved display invokes a UI feature. When two palm-sized touches are detected for a predetermined period of time (e.g., with the touches being centered around the north pole), a UI feature is implemented by orb-like invocation gesture unit 502. The UI feature may be a menu presentation, a mode switch, and so forth. The menu may be circular, semi-circular, and so forth. Example mechanisms and techniques for orb-like invocation gesture unit 502 are described further herein below with particular reference to FIGS. 6A and 6B.

In an example embodiment with regard to rotation-based dragging unit 504, movements of objects on curved display 102 are accomplished, at least in part, using a rotation. Movements of displayed objects are manifested as rotations about the center of the curved display (e.g., around the center of a sphere). For instance, an axis may be determined, and an angle about the axis may define the movement of the displayed object. Rotation-based dragging unit 504 may also be used to facilitate object movements in conjunction with other embodiments. Example mechanisms and techniques for rotation-based dragging unit 504 are described further herein below with particular reference to FIGS. 7A and 7B.

In an example embodiment with regard to send-to-dark-side interaction unit 506, objects may be sent to the opposite side of the curved display. In an example operation, the sending of the object is initiated by a palm touch on the object. Send-to-dark-side interaction unit 506 performs the sending responsive to a palm-sized touch (e.g., a touch meeting a predefined size threshold) that is made for a predefined temporal threshold (e.g., approximately one second). The touched object is "warped" approximately 180 degrees to the opposite side of the curved display. In one implementation, the latitude of the object (in terms of a spherical type curved display) remains the same as the object is warped to the opposite side. In other words, it may be considered that the height of the object remains the same. In an alternative implementation, the object is warped through the "center" of the curved display so that the "height" of the object is also changed by the warping. Example mechanisms and techniques for send-to-dark-side interaction unit 506 are described further herein below with particular reference to FIGS. 8A and 8B.

In an example embodiment with regard to object representation and manipulation by proxy representation unit 508, objects displayed on the dark side of a curved display may be rendered on the side nearer to a user with a proxy representation. The proxy representation may be used to manipulate (e.g., size, move, etc.) the actual object on the other side with object representation and manipulation by proxy representation unit 508. The location of a corresponding object and its proxy representation may be swapped from one side to the other (e.g., with send-to-dark-side interaction unit 506). Objects and their respective proxy representations may be swapped individually or in groups, including swapping each proxy representation that currently exists. Example mechanisms and techniques for object representation and manipulation by proxy representation unit 508 are described further herein below with particular reference to FIGS. 9A and 9B.

Orb-Like Invocation Gesture Unit

The ability to switch between tasks and to select different options is often provided in interactive systems. The orb-like invocation gesture technique can provide this ability. In an example implementation, a circular menu is invoked and enables the user to select between multiple applications. The menu may be displayed in a circular arrangement around the top of the (e.g., spherical) display. It is therefore visible to most users. However, when a location of the user is known, the menu may be placed in a semi-circle facing the user. Selection of an option may be performed by touching an option. Alternatively, selection may be realized by rotating the menu in place. The highlighted option is selected upon removal of the touch contacts. By combining the orb-like invocation with selection by rotation (rather than direct touching), task switching can be performed in one continuous interaction (e.g., place hands to invoke menu of options, rotate desired option into place, and lift-off to select the option).

Figure 6A:
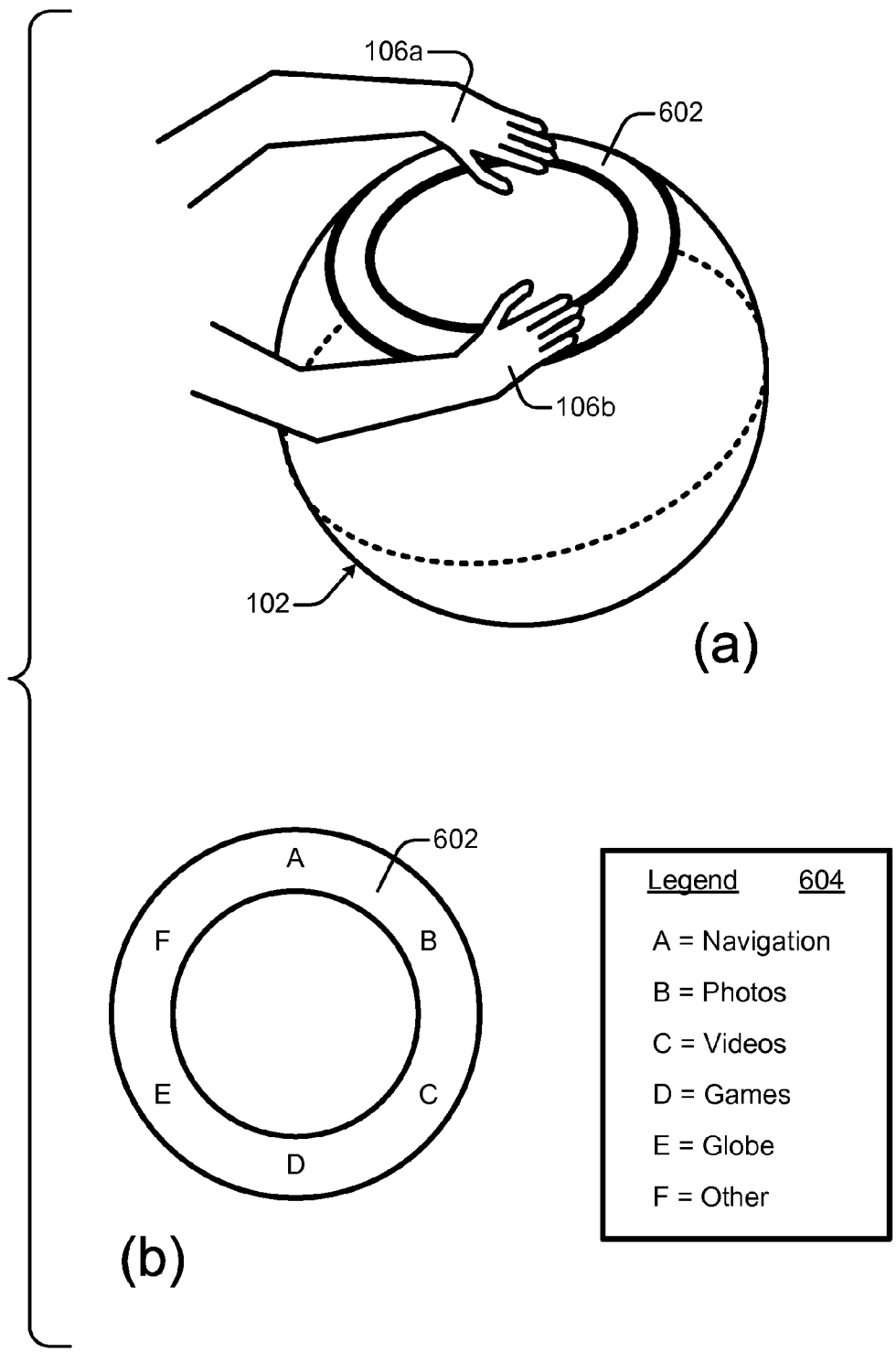
FIG. 6A illustrates an example mechanism for an orb-like invocation gesture unit.

FIG. 6A illustrates an example mechanism 600A for an orb-like invocation gesture unit. As illustrated, orb-like invocation gesture mechanism 600A includes a 3D representation of an example orb-like invocation gesture at portion (a) (top half of figure) and an example menu 602 at portion (b) (bottom half of figure). With portion (a), a user with two members 106a and 106b is interacting with curved display 102. The orb-like invocation gesture invokes a mode switch, a menu, and so forth. As specifically shown, a circular menu 602 is invoked.

For example embodiments, the posture for this gesture may evoke the feeling of interaction with a fortune-telling magic crystal ball. It involves placing two hands (e.g., in an open palm posture) an approximately equal distance from a predetermined point, such as the top of a sphere. The posture is designed to facilitate mode switching or menu invocation on a curved display. For the illustrated example, a circular menu 602 fades in accompanied by a sound effect to enhance the experience.

While playful and magic-like, this bimanual posture gesture is also highly memorable, easy to repeat, and relatively hard to invoke inadvertently. A palm-sized contact is substantially larger than most other touch contacts. Thus, the size of the two contacts and the particular symmetric arrangement of this posture jointly ensure that the gesture is not easily triggered in error.

Different menus 602 may be invoked. However, the illustrated menu 602 is circular. It may include any number of different menu options. Six example menu options A-F are shown in legend 604. They include navigation, photos, videos, games, globe, and an "other" category to represent alternative options. Other alternative options include, but are not limited to, an omni-directional data viewer, a paint application, a browser, and so forth. The options may be represented in menu 602 by icons or text or both. The text of each option may be oriented toward the user, may be arranged in a circle, and so forth.

Figure 6B:
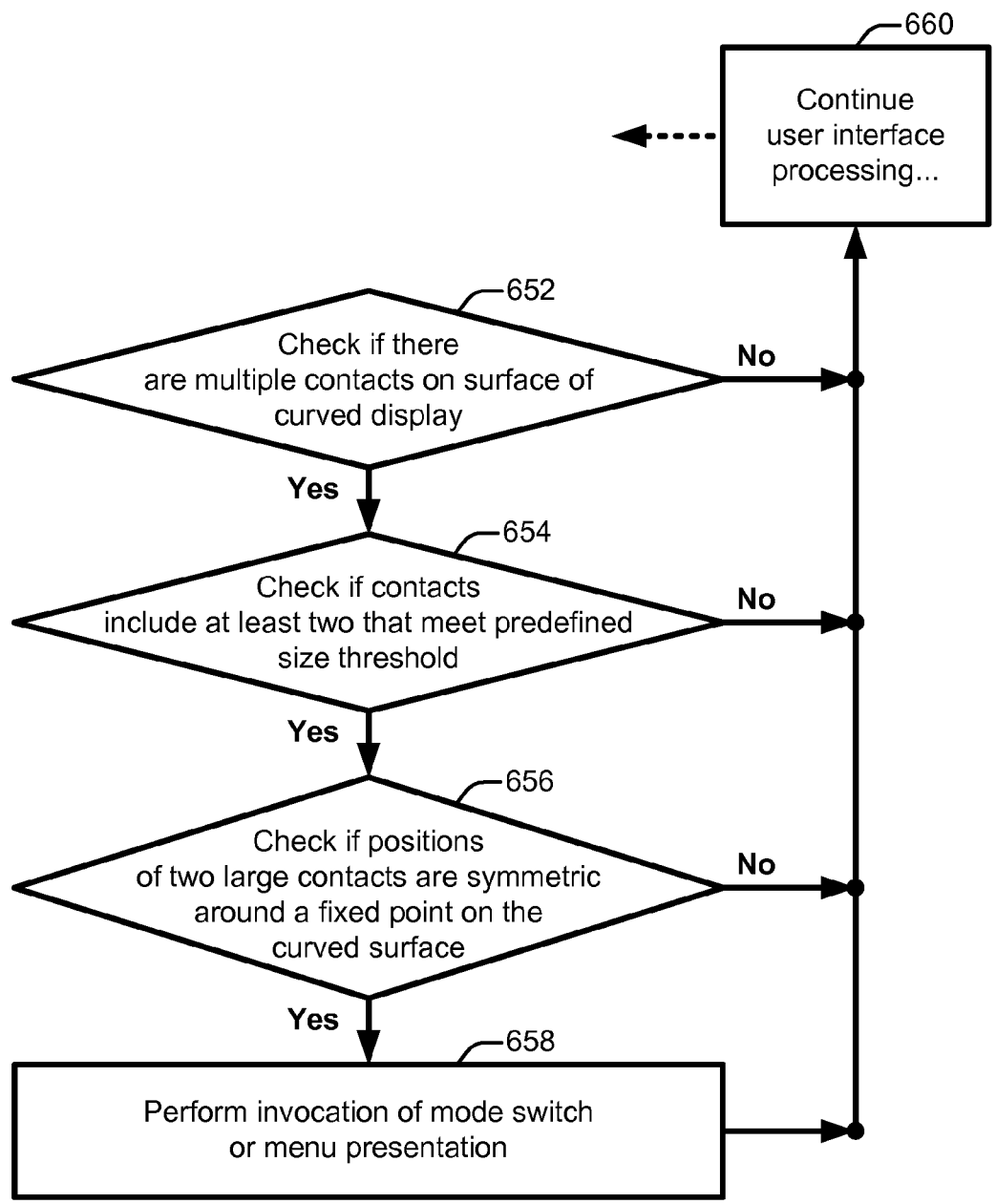
FIG. 6B is a flow diagram that illustrates an example of a method for an orb-like invocation gesture technique.

FIG. 6B is a flow diagram 600B that illustrates an example of a method for an orb-like invocation gesture technique. Flow diagram 600B includes five blocks 652-660. For example embodiments, at block 652, it is checked if there are multiple touch contacts on the surface of the curved display. If so, then at block 654 it is checked if the multiple touch contacts include at least two that are sufficiently large so as to meet a predefined size threshold. This can differentiate palm touches from "mere" finger touches, for instance.

If so, then at block 656 it is checked if the positions of the two large touch contacts (those that meet the predefined size threshold) are substantially symmetric around a fixed point on the curved surface. The fixed point may be, for instance, the top of a spherical or hemispherical curved display. This substantially symmetric check may be performed using any of a number of different methods. However, a method involving an angular threshold and a radius threshold is described by way of example. To implement the angular threshold, the two contacts can be constrained to be no more than "X" degrees off of 180 degrees around the fixed point. To implement the radius threshold, the two contacts may be constrained to be within a thresholded distance value away from the fixed point.

If the positions of the two large contacts are substantially symmetric around the fixed point on the curved surface (as checked at block 656), then at block 658 the invocation of a mode switch or menu presentation is performed. In other words, if each of the checking actions produces an affirmative result, the invocation of a mode switch, menu presentation, or other interaction feature may be performed. The menu may be the same as or similar to the illustrated circular task-switching menu (e.g., menu 602 of FIG. 6A). A mode switch may cycle through the menu options or otherwise switch to a different mode of operation, interaction, and so forth. If any of the checks at blocks 652, 654, or 656 are negative, then UI processing continues at block 660. The continued UI processing may be for any of the techniques described herein or other UI-related processing.

Rotation-Based Dragging Unit

As described herein above with particular reference to FIG. 2, a curved surface is not a Euclidian space. Consequently, utilizing a traditional 2D or 3D linear-oriented vector to implement object translations results in problematic behaviors (e.g., distortions) on a curved display. To avoid these problematic behaviors, an arc-oriented rotation may be utilized to implement object movements on a curved display. Rotations may be realized using, for example, quaternions, Euler angles, arc-lengths around an axis, combinations thereof, and so forth.

Figure 7A:
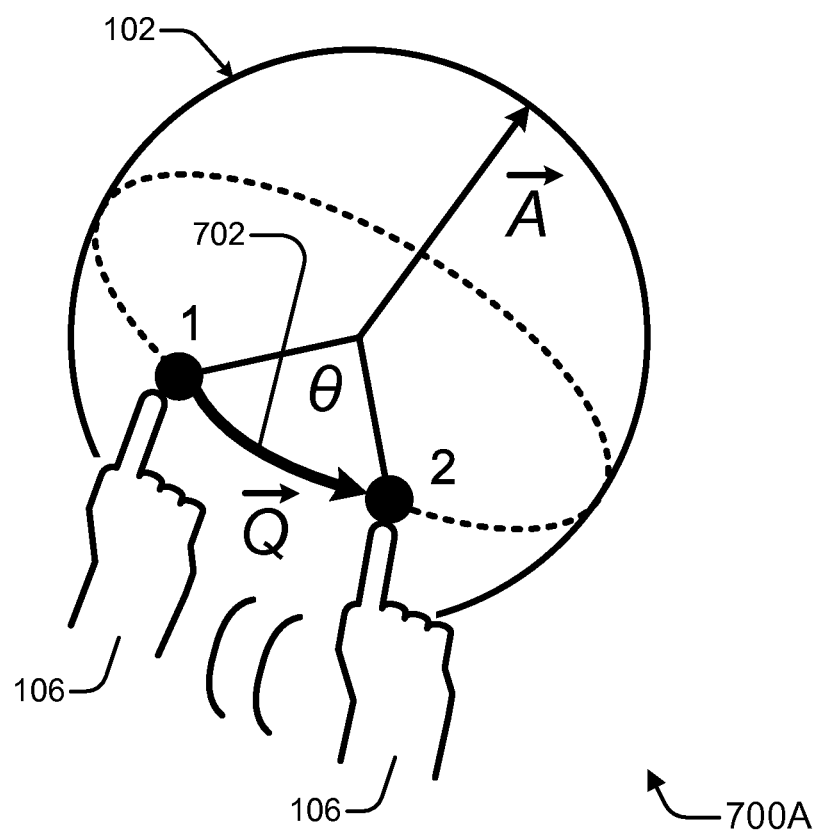
FIG. 7A illustrates an example mechanism for a rotation-based dragging unit.

FIG. 7A illustrates an example mechanism 700A for a rotation-based dragging unit. As illustrated, rotation-based dragging mechanism 700A includes curved display 102, a member 106, and a quaternion 702. Member 106 is in touch contact with curved display 102. Member 106 is moved from point 1 to point 2, which defines an arc on curved display 102. Although rotation-oriented movements are illustrated in FIG. 7A with reference to a quaternion 702, this is by way of example only. Rotations may be implemented in alternative manners.

In an example embodiment, the defined arc is interpreted as or mapped to a rotation. Thus, instead of using linear vectors for translational displacements, movements on curved displays are represented by rotations (e.g., quaternions, Euler angles, arc-lengths around an axis, etc.). This rotation-based representation may impact many of the interactions on curved surfaces. For example, the traditional translation+rotation+scale manipulation model used in 2D and 3D environments is transformed into a compound rotation+scale manipulation model on the curved surface (e.g., on a spherical display). The rotation is often a compound action inasmuch as the object may be spherically "positioned": (i) by a rotation around the origin of the sphere and then (ii) by a further orientation in the local coordinate system of the object.

Quantitatively, when a finger of member 106 drags an object between points 1 and 2 on a sphere-shaped curved display 102, this movement follows an arc of an angle θ around an axis $\vec{A}$ (which is a 3D vector). This arc is a rotation that is ably described, for example, by a 4D quaternion $\vec{Q}$. Thus, a rotation may be associated with an axis and an angle, so the rotation represents an arc over the curved display. The rotation can therefore be used to move, position, or otherwise present an object on a curved display.

In addition to allowing a user to position (i.e., rotate) an object around the curved display, an additional 1D adjustment of the object's orientation in its local coordinate system may be enabled. It is similar to in-plane rotation of a picture on a flat surface. This operation involves at least two contacts that are touching the object. The local angular difference between those two contacts is mapped to a 1D rotation of the object. For basic manipulations, when multiple contacts are touching a particular object, their behavior may be aggregated, and the aggregate action may be applied to the object.

Figure 7B:
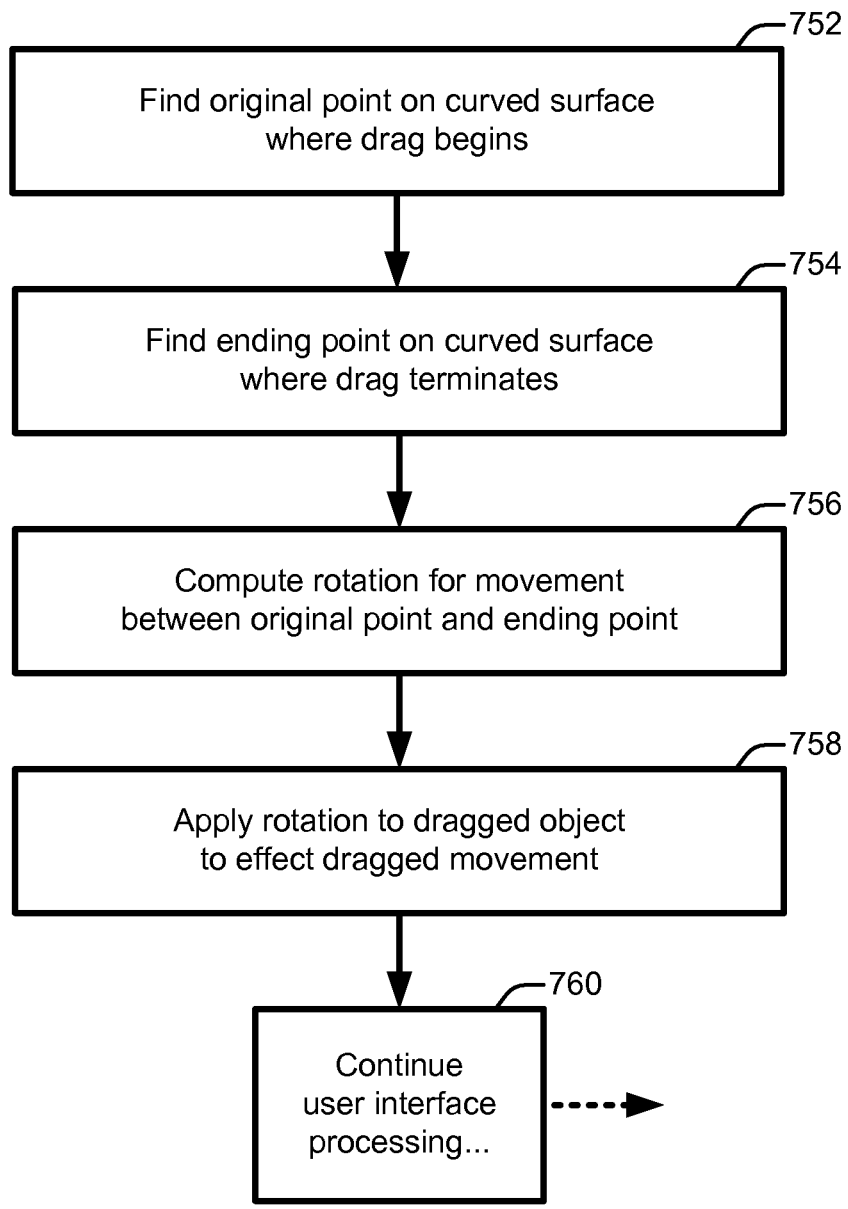
FIG. 7B is a flow diagram that illustrates an example of a method for a rotation-based dragging technique.

FIG. 7B is a flow diagram 700B that illustrates an example of a method for a rotation-based dragging technique. Flow diagram 700B includes five blocks 752-760. It is directed to a dragging movement of an object that is presented on a curved display. For example embodiments, at block 752, the original point on a curved surface where a drag begins is found. At block 754, the ending point on a curved surface where the drag terminates is found.

At block 756, a rotation to represent the movement between the original point and the ending point is computed. At block 758, the computed rotation is applied to the dragged object to effect the dragged movement. At block 760, UI processing is continued.

Send-to-Dark-Side Interaction Unit

In many scenarios, a user may want to place an object on the other side of a curved display. This is more likely to be the case when the user is collaborating with a viewer who is standing on the opposite side of the curved display. Although the user can simply drag an object to the other side, this action becomes tedious if it is repeated often because it entails extensive physical movement. A send-to-dark-side mechanism can facilitate this action by effectively further extending the reach of the user.

Figure 8A:
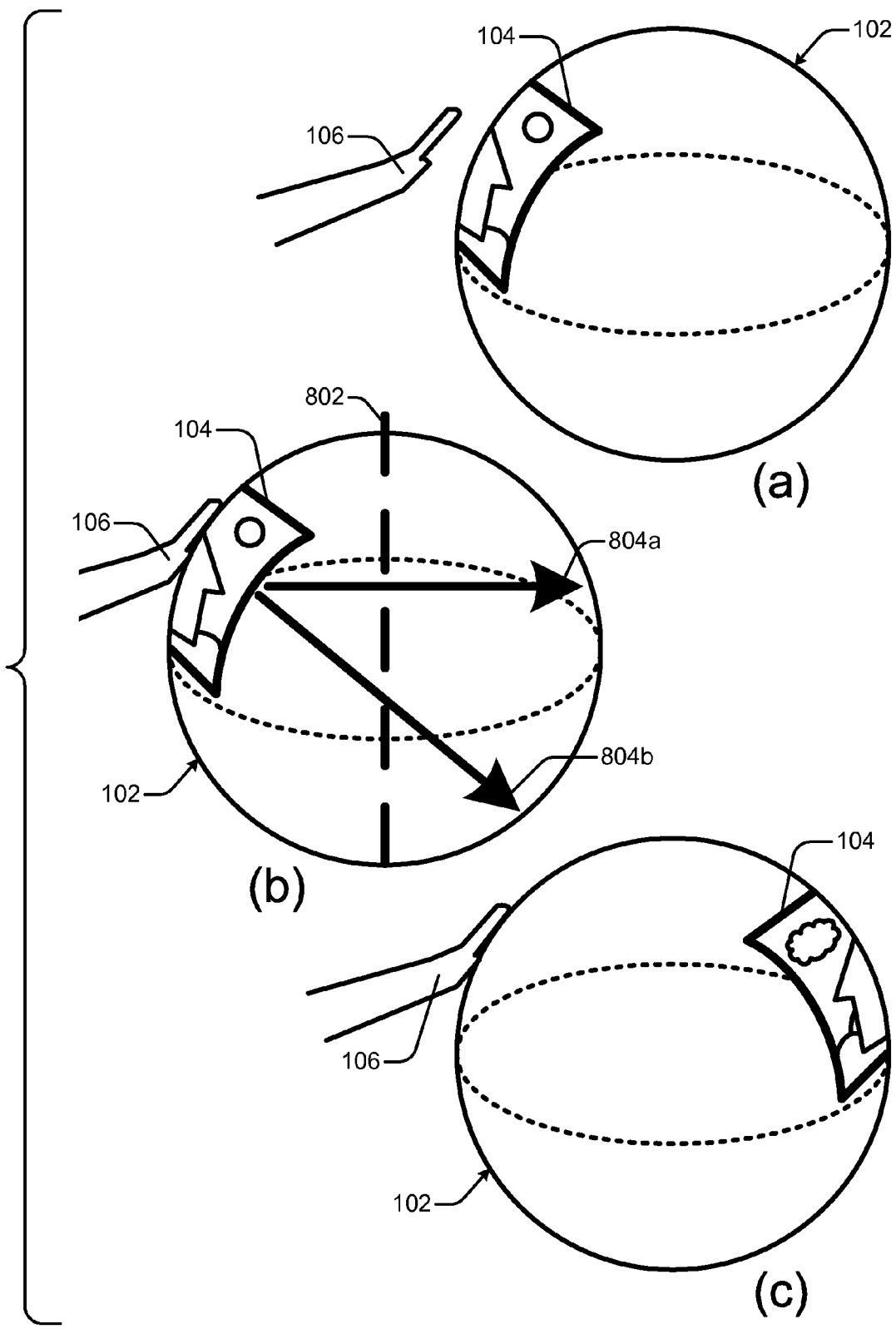
FIG. 8A illustrates an example mechanism for a send-to-dark-side interaction unit.

FIG. 8A illustrates an example mechanism 800A for a send-to-dark-side interaction unit. Generally, if a user touches an object with a larger contact (e.g., a flat hand) and waits a predetermined amount of time (e.g., 1 second), the touched object is warped to the other side of the curved display (e.g., a spherical display). As illustrated, send-to-dark-side mechanism 800A includes a curved display 102, an object 104, a member 106, a plane 802, and two trajectories 804a and 804b.

Portion (a) (at the top third of the figure) represents an initial position at which object 104 is displayed. Portion (b) (at the middle third of the figure) represents an operative phase of the send-to-dark-side interaction. Portion (c) represents a final position of object 104. With reference to portion (b), the "light side" is considered to be the side of curved display 102 that is proximate to the user, which is to the left of plane 802. The "dark side" is the side of curved display 102 that is distant from the user and at least partially out-of-sight of the user. The "dark side" is to the right of plane 802.

A send-to-dark-side interaction enables a user to explicitly warp an object 104 so as to send it "instantaneously" (i.e., without manual dragging) to the other side of a curved display 102. To perform a send-to-dark-side operation (as shown in portion (b)), the user places a relatively large member 106 (e.g., a flat palm) on top of object 104 and waits a predetermined time period. Object 104 is then warped across plane 802. For example, object 104 may be warped along trajectory 804a to the opposite and mirrored position on the other hemisphere (e.g., with the latitude being maintained). This trajectory 804a mirrors the position of object 104 around the plane 802 that is passing through the top and the bottom of the sphere. Alternatively, object 104 may be warped along trajectory 804b directly to the opposite point of curved display 102 (e.g., with the latitude being changed). Following trajectory 804b switches the location of object 104 both from the upper to the lower hemisphere (e.g., through the equator) as well as from the left to the right hemisphere (e.g., through plane 802).

With send-to-dark-side functionality, a user need not flick an object and guess at its ultimate destination. Instead, the user can explicitly control where the object is to appear (on the dark side) by first manipulating the object's position in its current hemisphere (on the light side) and then activating the send-to-dark-side mechanism. It should be noted that send-to-dark-side interaction can produce more user-friendly results if auto-rotation functionality is activated, which can ensure that a predetermined orientation (e.g., the "up" direction) is maintained for displayed objects. Auto-rotation behavior, when activated, prevents objects from arriving in the other hemisphere upside down and thus in need of reorientation. Auto-rotation behavior is described further in another U.S. Nonprovisional Patent Application to Benko et al. that is filed on even date herewith, that is entitled "Touch Interaction with a Curved Display", and that is assigned to the same Assignee (Microsoft Corp.).

Figure 8B:
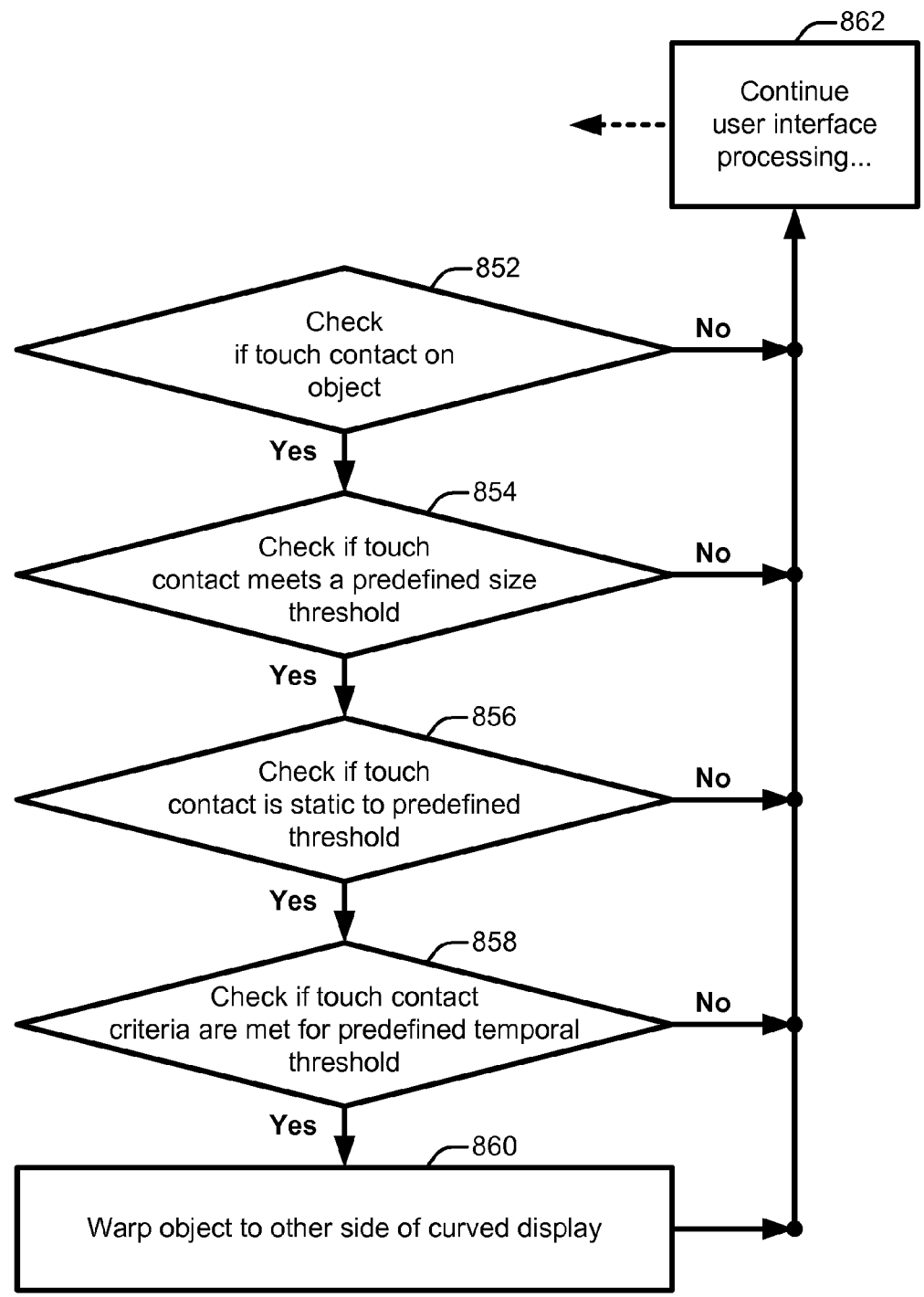
FIG. 8B is a flow diagram that illustrates an example of a method for a send-to-dark-side interaction technique.

FIG. 8B is a flow diagram 800B that illustrates an example of a method for a send-to-dark-side interaction technique. Flow diagram 800B includes six blocks 852-862. For example embodiments, at block 852, it is checked if there is a touch contact on an object (for a first touch contact criteria). If so, then at block 854, it is checked if the touch contact meets a predefined size threshold (for a second touch contact criteria). The predefined size threshold may be set, for example, to a relatively large size sufficient to indicate a palm or full hand contact by member 106 as opposed to a contact that is from "merely" a finger or two.

If the touch contact is detected to meet the predefined size threshold (at block 854), then at block 856 it is checked if the touch contact is static to a predefined threshold (for a third touch contact criteria). In other words, it may be verified that the touch contact location and/or size is unmoving to a predefined threshold. If so, then at block 858, it is checked if the first, second, and third touch contact criteria (e.g., object contact, of a predefined size, and in a static condition) are met for a predefined temporal threshold. By way of example only, the predefined temporal threshold may be one second.

If the touch contact criteria are determined to have been met for a predefined temporal threshold (at block 858), then at block 860 the object is warped to the other side of the curved display. The warping of an object 104 may follow, for example, a trajectory 804a, a trajectory 804b, or another trajectory that passes through plane 802. If any of the checks at blocks 852, 854, 856, or 858 are negative, or after implementing the act(s) of block 860, UI processing is continued at block 862. The continued UI processing may be for any of the techniques described herein or other UI-related processing.

Object Representation and Manipulation by Proxy Representation Unit

When an operating user wishes to present an object to viewers on the other side of a curved display, the send-to-dark-side mechanism may be employed. After the object has been warped, however, the operating user may wish to continue to interact with the object that is now on the other side of the curved display. This functionality may be realized by an object representation and manipulation by proxy representation interaction technique. Manipulations of the proxy representation may be reflected in the actual corresponding object.

Figure 9A:
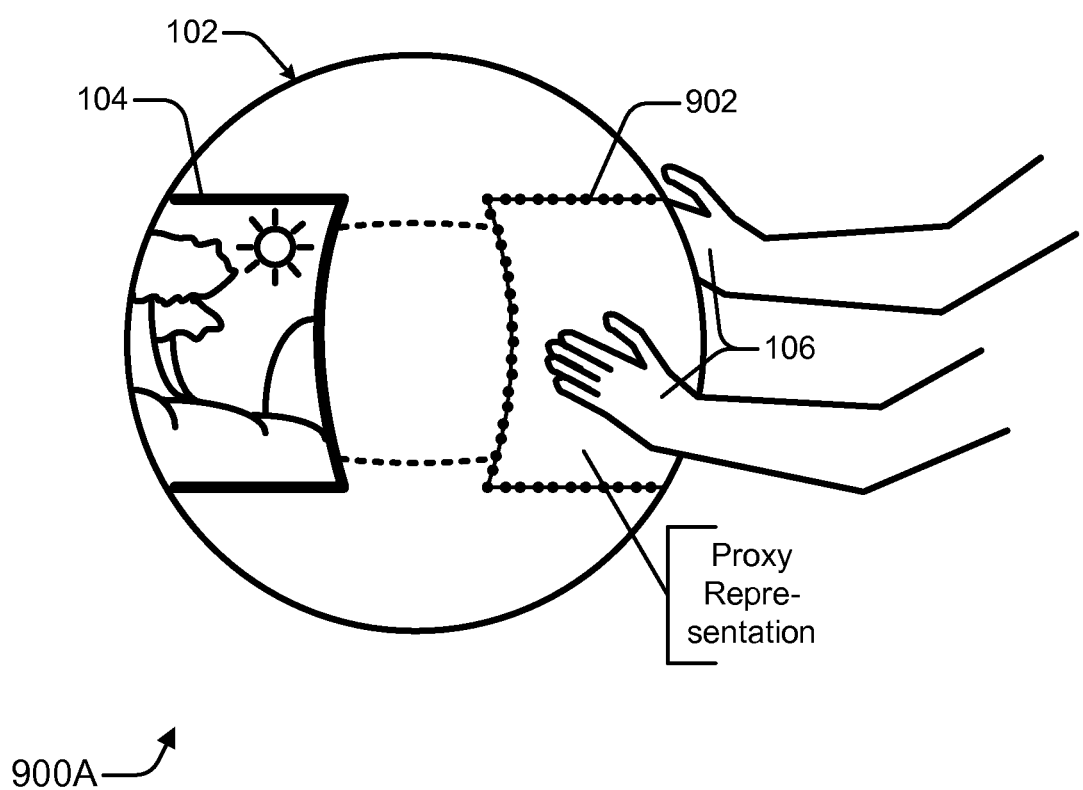
FIG. 9A illustrates an example mechanism for an object representation and manipulation by proxy representation unit.

FIG. 9A illustrates an example mechanism 900A for an object representation and manipulation by proxy representation unit. As illustrated, object representation and manipulation by proxy representation mechanism 900A includes a curved display 102, an object 104, one or more members 106, and a proxy representation 902. Proxy representation 902 corresponds to object 104. Generally, proxy representations 902 (aka "shadow objects") facilitate interactions with hard-to-reach objects 104 on the other side of curved display 102. This may be used, for example, when one person wishes to display and manipulate an object to people on the other side of the curved display. Although only one proxy representation 902 and corresponding object 104 are shown in FIG. 9A, multiple proxy representations may be simultaneously active for multiple corresponding objects.

Thus, to enable interaction with objects on the other side of a curved display, proxy representations of those same objects may be provided on the near side (e.g., opposite to the location of the actual object). A collection of photographs that are shown on a spherical display is described by way of example. Each photo is likely visible from a single hemisphere, but the corresponding proxy representations can be used on the other hemisphere to interact with those objects that are currently invisible and/or hard to reach.

For example embodiments, manipulations may include, but are not limited to, dragging movements, resizing, scaling or proportionality adjustments, changing which photo is on top, and so forth. Operations that may be performed directly on the content of an object may also be enabled via the proxy representation. For instance, a photo may be modified by changing brightness or contrast, by reducing red eyes, by activating a general touch up feature, by switching to another photo, and so forth.

By performing a "send-to-dark-side" interaction as described herein above, one can "instantly" swap the locations of the real objects and the proxy representations, either individually or jointly. While the objects 104 on the visible side are rendered normally, proxy representations 902 may be rendered in another form (e.g., by a string of circles connected by a line as shown in mechanism 900A). Alternative forms include, but are not limited to: outline, wire frame, grayscale, semi-transparent, darker, low-contrast image, an icon representation, combinations thereof, and so forth. Moreover, proxy representation 902 may be rendered similarly or identically to the actual corresponding object 104 (e.g., with a different-colored frame, with an indicator icon on the image or frame, etc.).

From the point of view of the user, both the full actual objects and the shadow proxy representations of the hidden objects may be visible. This makes it possible to access and manipulate those hard-to-reach objects. The proxy representation can also be used to render representations of the user's hands and/or touches in addition to the actual displayed objects on the visible side to provide to viewers a visual indication of what manipulations are being performed.

Intuitively, providing proxy representations can be thought of as having two surfaces with which to interact. The first is the primary surface; the one with actual visible objects. The second is a virtual secondary surface, the "dark side", which contains the proxy representations. A user may be empowered to swap between an individual object and the entirety of the surfaces. Objects on the secondary surface may be rendered in a simplified form (as described above) to emphasize their secondary role in the interaction.

Furthermore, a user may adjust the importance of objects on the visible side as compared to the dark side. For instance, the user may wish to give equal importance to both sides, whereby objects are rendered with equal weight. Or, the user may emphasize the light or the dark side, depending on the task at hand. The concepts of rendering differently the visual representations of objects of different levels of importance are also applicable to multi-layer surfaces.

Figure 9B:
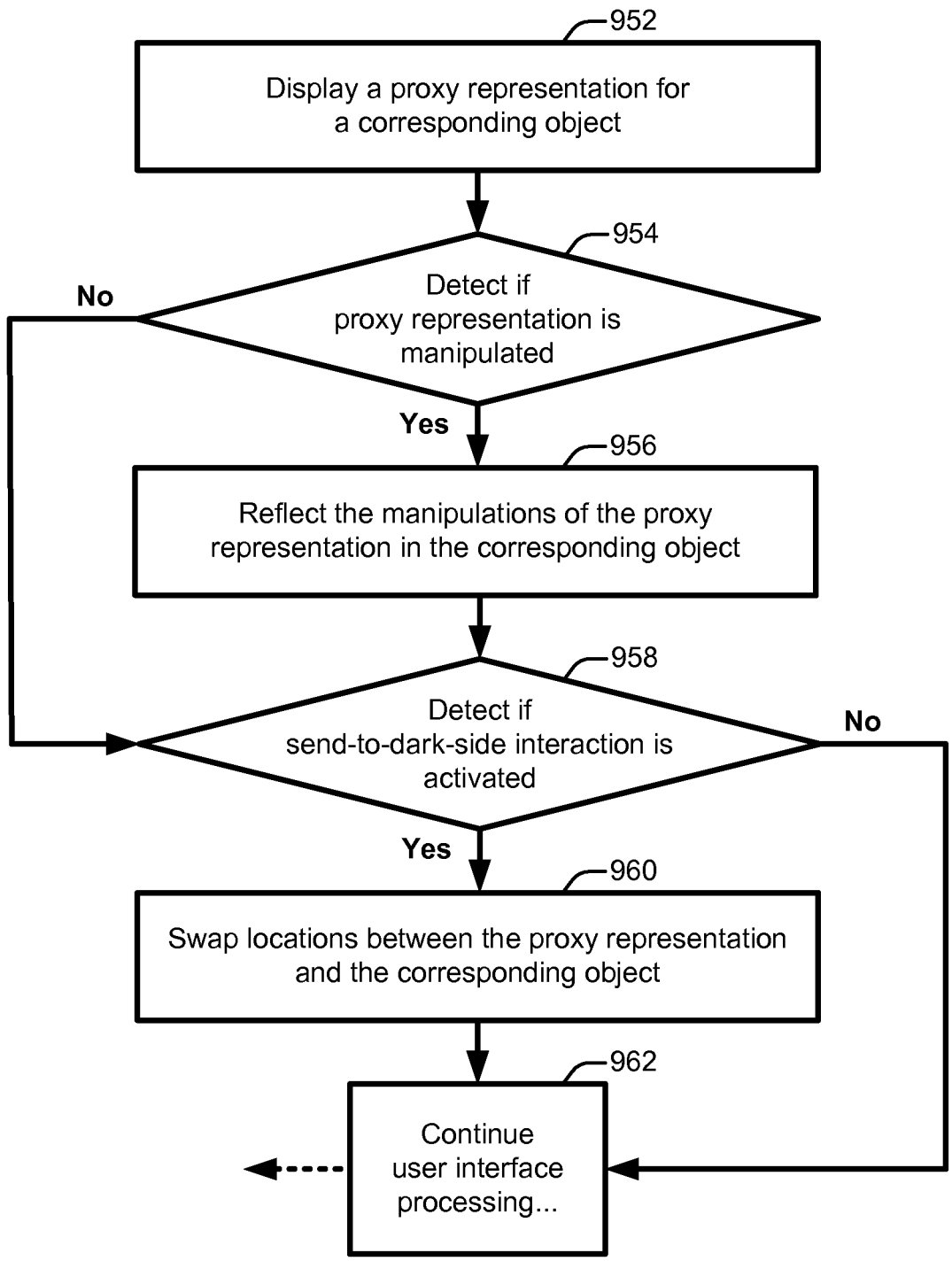
FIG. 9B is a flow diagram that illustrates an example of a method for an object representation and manipulation by proxy representation technique.

FIG. 9B is a flow diagram 900B that illustrates an example of a method for an object representation and manipulation by proxy representation technique. Flow diagram 900B includes six blocks 952-962. For example embodiments, at block 952, a proxy representation for a corresponding object is displayed. For instance, a proxy representation 902 may be displayed for a corresponding object 104 on the opposite side of a curved display 102.

At block 954, it is detected if the proxy representation is manipulated. For example, it may be detected if proxy representation 902 is subject to at least one manipulation by one or more members 106. If so, then at block 956 the manipulation(s) of the proxy representation are reflected in the corresponding object. For example, if members 106 resize proxy representation 902, then the corresponding object 104 may be resized accordingly.

If a proxy representation manipulation is not detected (at block 954) or after the performance of the act(s) of block 956, the detection act(s) of block 958 are performed. At block 958, it is detected if a send-to-dark-side interaction is activated. Example send-to-dark-side interactions are described herein above with particular reference to FIGS. 8A and 8B. If so, then at block 960 the locations of the proxy representation and the corresponding object are swapped. Otherwise, user interface processing may continue at block 962.

FIG. 10 is a block diagram 1000 illustrating example devices 300 that may be used to implement embodiments for touch interaction with a curved display. As illustrated, block diagram 1000 includes two devices 300a and 300b, person-device interface equipment 1012, and one or more network(s) 1002. As explicitly shown with device 300a, each device 300 may include one or more input/output interfaces 1004, at least one processor 1006, and one or more media 1008. Media 1008 may include processor-executable instructions 1010.

For example embodiments, device 300 may represent any processing-capable device. Example devices 300 include personal or server computers, hand-held or other portable electronics, entertainment appliances, media presentation or collaborative tools, network components, some combination thereof, and so forth. Device 300a and device 300b may communicate over network(s) 1002. Network(s) 1002 may be, by way of example but not limitation, an internet, an intranet, an Ethernet, a public network, a private network, a cable network, a digital subscriber line (DSL) network, a telephone network, a wireless network, some combination thereof, and so forth. Person-device interface equipment 1012 may be a keyboard/keypad, a touch screen, a remote, a mouse or other graphical pointing device, a curved display 102 (e.g., of FIGS. 1 and 3), a display component 304 (e.g., of FIG. 3), and so forth. Person-device interface equipment 1012 may be integrated with or separate from device 300a.

I/O interfaces 1004 may include (i) a network interface for monitoring and/or communicating across network 1002, (ii) a display device interface for displaying information on a display screen, (iii) one or more person-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) person-device interfaces include those that communicate by wire or wirelessly to person-device interface equipment 1012. A given interface (e.g., curved display 102) may function as both a display device interface and a person-device interface.

Processor 1006 may be implemented using any applicable processing-capable technology, and one may be realized as a general-purpose or a special-purpose processor. Examples include a central processing unit (CPU), a microprocessor, a controller, a graphics processing unit (GPU), a derivative or combination thereof, and so forth. Media 1008 may be any available media that is included as part of and/or is accessible by device 300. It includes volatile and non-volatile media, removable and non-removable media, storage and transmission media (e.g., wireless or wired communication channels), hard-coded logic media, combinations thereof, and so forth. Media 1008 is tangible media when it is embodied as a manufacture and/or as a composition of matter.

Generally, processor 1006 is capable of executing, performing, and/or otherwise effectuating processor-executable instructions, such as processor-executable instructions 1010. Media 1008 is comprised of one or more processor-accessible media. In other words, media 1008 may include processor-executable instructions 1010 that are executable by processor 1006 to effectuate the performance of functions by device 300. Processor-executable instructions 1010 may be embodied as software, firmware, hardware, fixed logic circuitry, some combination thereof, and so forth.

Thus, realizations for touch interaction with a curved display may be described in the general context of processor-executable instructions. Processor-executable instructions may include routines, programs, applications, coding, modules, protocols, objects, components, metadata and definitions thereof, data structures, APIs, etc. that perform and/or enable particular tasks and/or implement particular abstract data types. Processor-executable instructions may be located in separate storage media, executed by different processors, and/or propagated over or extant on various transmission media.

As specifically illustrated, media 1008 comprises at least processor-executable instructions 1010. Processor-executable instructions 1010 may comprise, for example, processing unit 310 (of FIG. 3) or any portion thereof (e.g., interaction unit 302). Generally, processor-executable instructions 1010, when executed by processor 1006, enable device 300 to perform the various functions described herein. Such functions include, by way of example but not limitation, those that are illustrated in flow diagrams 400, 600B, 700B, 800B, 900B (of FIGS. 4, 6B, 7B, 8B, and 9B) and those pertaining to features and mechanisms that are illustrated in the various block diagrams, as well as combinations thereof, and so forth.

The devices, acts, features, functions, methods, modules, data structures, techniques, components, etc. of FIGS. 1 and 3-10 are illustrated in diagrams that are divided into multiple blocks and other elements. However, the order, interconnections, interrelationships, layout, etc. in which FIGS. 1 and 3-10 are described and/or shown are not intended to be construed as a limitation, and any number of the blocks and/or other elements can be modified, combined, rearranged, augmented, omitted, etc. in many manners to implement one or more systems, methods, devices, media, apparatuses, arrangements, etc. for touch interaction with a curved display.

Although systems, methods, devices, media, apparatuses, arrangements, and other example embodiments have been described in language specific to structural, logical, algorithmic, and/or functional features, it is to be understood that the invention defined in the appended claims is not necessarily limited to the specific features or acts described above. Rather, the specific features and acts described above are disclosed as example forms of implementing the claimed invention.

What is claimed is:

1. A device comprising:
   a curved display;
   a hardware processor; and
   processor-readable instructions which, when executed by the hardware processor, configure the hardware processor to implement a detection unit and an interaction unit, wherein:
   the detection unit is adapted to:
      monitor the curved display to detect a touch input on an exterior of the curved display, the curved display displaying an object for manipulation on the curved display, and
      detect a location of the touch input on the curved display, the touch input identifying the object displayed on the curved display; and
   the interaction unit is adapted to warp the object from one side of the curved display to another side of the curved display that is opposite from the one side of the curved display and is at least partially out-of-sight of a user providing the touch input,
   the interaction unit being adapted to warp the object responsive to detection that the touch input meets at least one of a predefined size threshold or a predefined temporal threshold.

2. The device as recited in claim 1, wherein the curved display is spherical, cylindrical, or hemispherical.

3. The device as recited in claim 1, wherein the interaction unit is adapted to warp the object responsive to detection that the touch input meets both the predefined size threshold and the predefined temporal threshold.

4. The device as recited in claim 3, wherein the predefined size threshold is sufficiently large such that the interaction unit is adapted to warp the object in instances when the touch input is from a palm of a user's hand and to not warp the object when the touch input is from a finger of the user's hand.

5. The device according to claim 1, wherein the interaction unit is adapted to warp the object from a first latitude on the one side of the curved display to a different latitude on the another side of the curved display.

6. The device according to claim 1, wherein the curved display comprises at least part of a sphere having an upper hemisphere and a lower hemisphere and the interaction unit is adapted to warp the object so that the object switches from the upper hemisphere to the lower hemisphere.

7. The device according to claim 1, wherein the interaction unit is adapted to warp the object from the one side of the curved display to the another side of the curved display without changing a latitude of the object.

8. The device of claim 1, wherein the interaction unit is adapted to automatically reorient the object on the another side of the curved display to maintain a predetermined orientation of the object.

9. The at least one memory device or storage device according to claim 1, wherein the object is warped 180 degrees from the one side of the curved display.

10. A device comprising:
    a curved display;
    a hardware processor; and
    processor-readable instructions which, when executed by the hardware processor, configure the hardware processor to implement a detection unit and an interaction unit, wherein:
    the detection unit is adapted to monitor the curved display to detect locations of touch inputs on an exterior of the curved display, and
    the interaction unit is adapted to:
       detect that the touch inputs include two contacts placed substantially symmetrically around a fixed point on the curved display by determining that the two contacts are within an angular threshold, wherein the angular threshold constrains the two contacts to no more than a certain number of degrees off of 180 degrees around the fixed point on the curved display; and responsive to the detecting the two contacts have been placed substantially symmetrically around the fixed point on the curved display, invoke a menu on the curved display.

11. The device according to claim 10, wherein the curved display is a sphere and the fixed point is a top of the sphere.

12. The device according to claim 11, wherein the interaction unit is adapted to determine whether the two contacts are sufficiently large to meet a predefined size threshold and invoke the menu when: the two contacts are sufficiently large; and the two contacts are within the angular threshold of 180 degrees around the fixed point.

13. The device according to claim 11, wherein the interaction unit is adapted to determine that the two contacts are placed substantially symmetrically around the top of the sphere by applying a radius threshold in addition to the angular threshold.

14. The device according to claim 13, wherein the interaction unit is adapted to apply the radius threshold by determining that the two contacts are within a threshold distance from the top of the sphere.

15. The device according to claim 14, wherein the interaction unit is adapted to determine whether the two contacts are sufficiently large to meet a predefined size threshold and invoke the menu when: the two contacts are sufficiently large; the two contacts are within the radius threshold from the top of the sphere; and the two contacts are within the angular threshold of 180 degrees around the top of the sphere.

16. A device comprising:
a curved display;
a hardware processor; and
processor-readable instructions which, when executed by the hardware processor, configure the hardware processor to implement a detection unit and an interaction unit, wherein:
the detection unit is adapted to monitor the curved display to detect locations of touch inputs on an exterior of the curved display, and
the interaction unit is adapted to:
detect that the touch inputs include two contacts placed substantially symmetrically around a fixed point on the curved display by determining that the two contacts are within a radius threshold, wherein the radius threshold constrains the two contacts to no more than a certain distance from the fixed point on the curved display; and
responsive to the detecting the two contacts have been placed substantially symmetrically around the fixed point on the curved display, invoke a menu on the curved display.

17. The device according to claim 16, wherein the curved display is a sphere and the fixed point is a top of the sphere.

18. The device according to claim 16, wherein the interaction unit is adapted to determine that the two contacts are placed substantially symmetrically around the fixed point by applying an angular threshold in addition to the radius threshold.

19. The device according to claim 18, wherein applying the angular threshold comprises determining that the two contacts are not more than a certain number of degrees off of 180 degrees around the fixed point on the curved display.

20. The device according to claim 16, wherein the menu is circular and includes at least one menu option corresponding to an application.

* * * * *